United States Patent
Tajima

(10) Patent No.: US 11,172,083 B2
(45) Date of Patent: Nov. 9, 2021

(54) INTEGRATED WORKFLOW EXECUTION CONTROL THAT SWITCHES DISPLAY TO FIRST SCREEN OR SECOND SCREEN BASED ON DETERMINATION CRITERION

(71) Applicant: Konica Minolta, Inc., Tokyo (JP)

(72) Inventor: Hiroki Tajima, Itami (JP)

(73) Assignee: Konica Minolta, Inc., Tokyo (JP)

( * ) Notice: Subject to any disclaimer, the term of this patent is extended or adjusted under 35 U.S.C. 154(b) by 58 days.

(21) Appl. No.: 16/698,181

(22) Filed: Nov. 27, 2019

(65) Prior Publication Data
US 2020/0195793 A1 Jun. 18, 2020

(30) Foreign Application Priority Data
Dec. 17, 2018 (JP) .............................. JP2018-235587

(51) Int. Cl.
*H04N 1/00* (2006.01)

(52) U.S. Cl.
CPC ....... *H04N 1/00408* (2013.01); *H04N 1/0048* (2013.01); *H04N 1/00204* (2013.01); *H04N 1/00477* (2013.01); *H04N 2201/0094* (2013.01)

(58) Field of Classification Search
CPC .......... H04N 1/00408; H04N 1/00204; H04N 1/0048; H04N 1/00477; H04N 2201/0094; H04N 1/00411; H04N 1/00474
See application file for complete search history.

(56) References Cited

U.S. PATENT DOCUMENTS

| 8,896,870 B2* | 11/2014 | Kobayashi | H04N 1/00408 |
| | | | 358/1.15 |
| 2009/0213407 A1* | 8/2009 | Kamiya | G03G 15/5087 |
| | | | 358/1.13 |
| 2018/0159993 A1* | 6/2018 | Funakawa | H04N 1/00408 |

FOREIGN PATENT DOCUMENTS

| CN | 108156344 A | 6/2018 |
| JP | H10124760 A | 5/1998 |
| JP | 201893360 A | 6/2018 |

OTHER PUBLICATIONS

Office Action issued in counterpart Chinese Patent Application No. 201911278078.9 dated Jul. 23, 2021 (17 pages).

* cited by examiner

Primary Examiner — Christopher Wait
(74) Attorney, Agent, or Firm — Osha Bergman Watanabe & Burton LLP

(57) ABSTRACT

An integrated apparatus includes: an image processing apparatus; an Information Technology (IT) processing apparatus; and a common display operation panel, wherein the integrated apparatus: obtains a workflow that combines a job executed by the image processing apparatus and a job executed by the IT processing apparatus; launches an application and causes each of the image processing apparatus and the IT processing apparatus to execute the job indicated in the workflow; and switches, based on a determination criterion related to a function exhibited by the image processing apparatus, display by the display operation panel at a time when the job indicated in the workflow is executed by the image processing apparatus, to the first screen or the second screen.

13 Claims, 17 Drawing Sheets

FIG. 6A

| PROGRESS STAGE | JOB START STATE | SCAN TASK START STATE | SCAN TASK COMPLETION STATE | PREVIEW TASK START STATE | PREVIEW TASK COMPLETION STATE | TRANSMISSION TASK START STATE | TRANSMISSION TASK COMPLETION STATE | JOB COMPLETION STATE |
|---|---|---|---|---|---|---|---|---|
| | J1 | S1 | C1 | S2 | C2 | S3 | C3 | J2 |
| FUNCTION ATTRIBUTE | 0: SUPPORTABLE | 0: SUPPORTABLE | 0: SUPPORTABLE | 1: UNSUPPORTABLE *REAL-TIME PREVIEW | 1: UNSUPPORTABLE *REAL-TIME PREVIEW | 0: SUPPORTABLE | 0: SUPPORTABLE | 0: SUPPORTABLE |

FIG. 6B

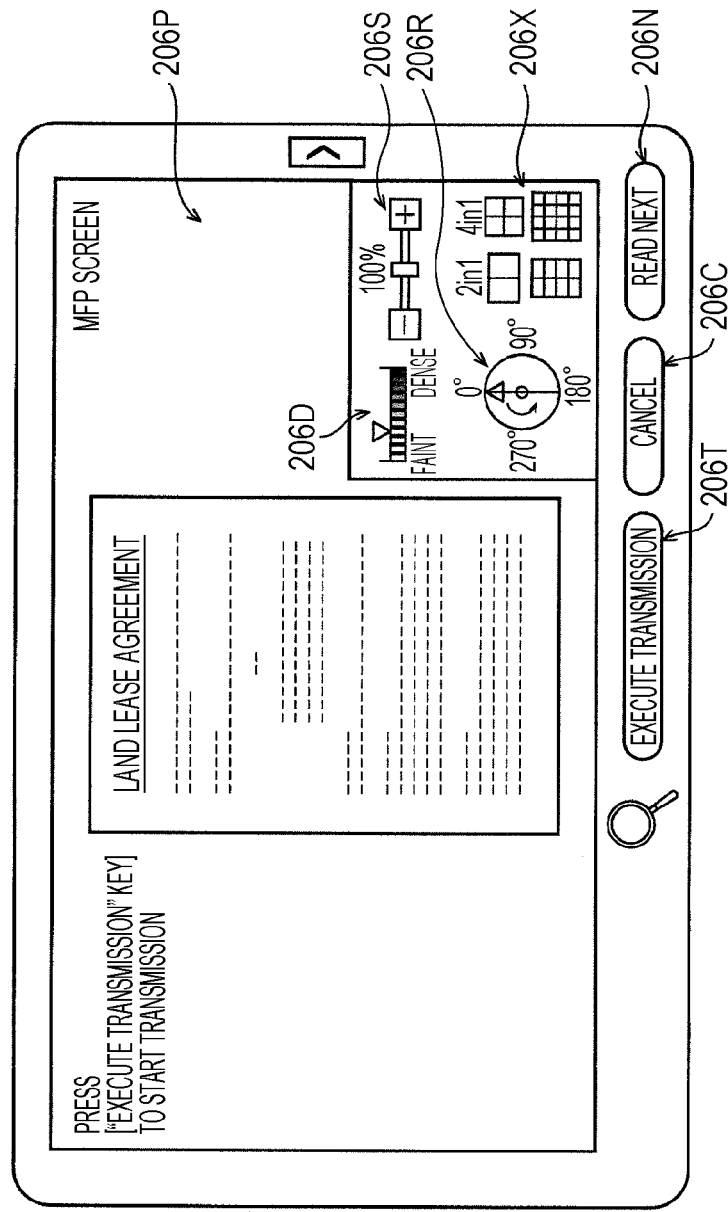

FIG. 12

| FUNCTION ATTRIBUTE | JOB SELECTION SCREEN | SCAN READING SCREEN | PREVIEW SCREEN | TRANSMITTING SCREEN |
|---|---|---|---|---|
| | 0: SUPPORTABLE | 0: SUPPORTABLE | 1: UNSUPPORTABLE *REAL-TIME PREVIEW | 0: SUPPORTABLE |

FIG. 13

| | D11 JOB SELECTION SCREEN | D21 SCAN READING SCREEN | D22 | D31 PREVIEW SCREEN | D32 | TRANSMITTING SCREEN |
|---|---|---|---|---|---|---|
| IN-SCREEN STATE | JOB START | DISPLAYING SCANNING MESSAGE | DISPLAYING CONTINUOUS READING CONFIRMATION BUTTON | GENERATING PREVIEW SCREEN | DISPLAYING TRANSMISSION EXECUTION BUTTON AND JOB CANCELLATION BUTTON | DISPLAYING TRANSMITTING MESSAGE |
| FUNCTION ATTRIBUTE | SUPPORTABLE | SUPPORTABLE | UNSUPPORTABLE *REAL-TIME PREVIEW | UNSUPPORTABLE *REAL-TIME PREVIEW | UNSUPPORTABLE *REAL-TIME PREVIEW | SUPPORTABLE |

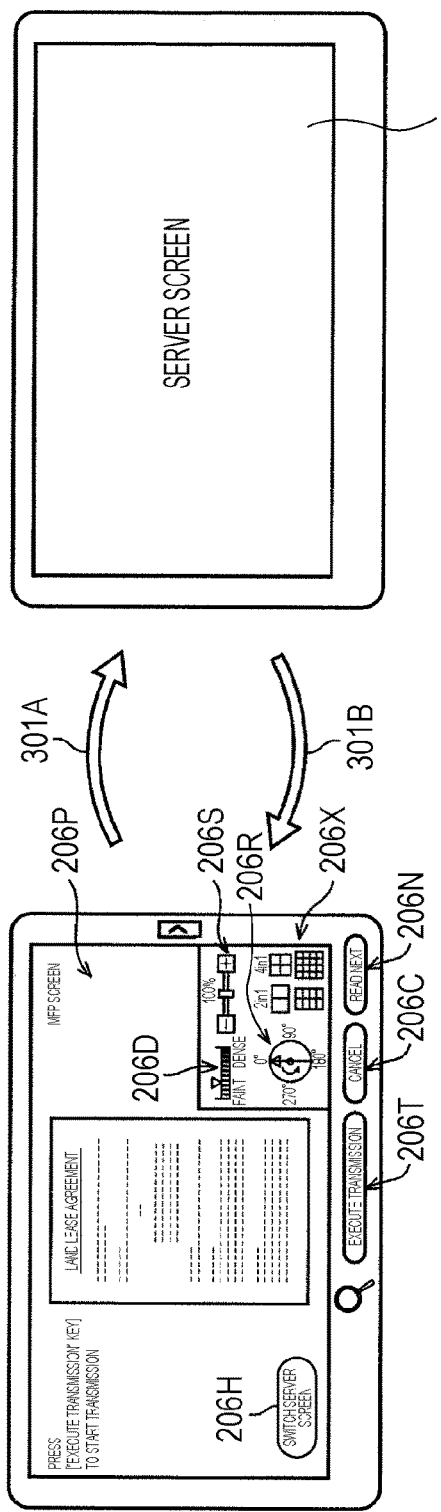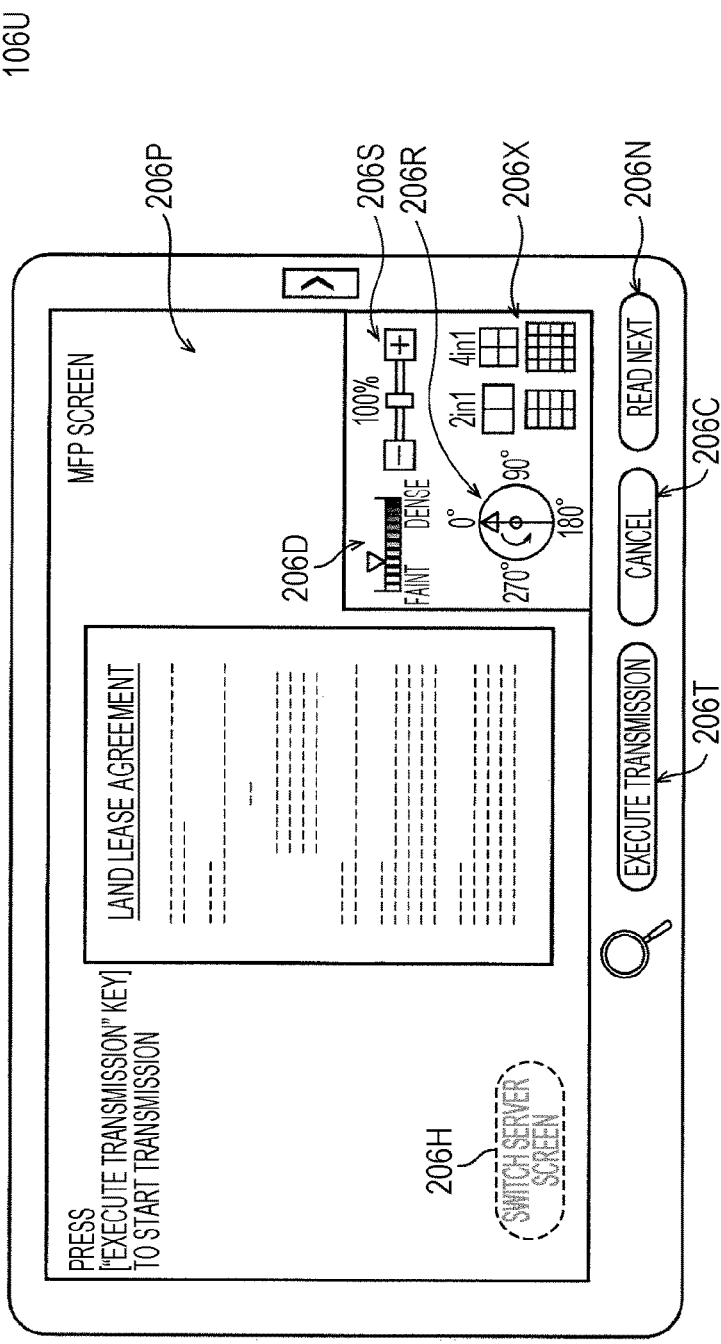
FIG. 14A
FIG. 14B

FIG. 15

FUNCTION ATTRIBUTE TABLE DATABASE

WF TYPE: SCANNING+PRINTING — 113a

| | JOB START STATE | SCAN TASK START STATE | SCAN TASK COMPLETION STATE | PREVIEW TASK START STATE | PREVIEW TASK COMPLETION STATE | TRANSMISSION TASK START STATE | TRANSMISSION TASK COMPLETION STATE | JOB COMPLETION STATE |
|---|---|---|---|---|---|---|---|---|
| TRANSITION DESTINATION STATUS | | | | | | | | — 113i |
| FUNCTION ATTRIBUTE | 0: SUPPORTABLE | 0: SUPPORTABLE | 0: SUPPORTABLE | 1: UNSUPPORTABLE | 1: UNSUPPORTABLE | 0: SUPPORTABLE | 0: SUPPORTABLE | 0: SUPPORTABLE |

WF TYPE: SCANNING+CLOUD STORAGE — 113b

| | JOB START STATE | SCAN TASK START STATE | SCAN TASK COMPLETION STATE | PREVIEW TASK START STATE | PREVIEW TASK COMPLETION STATE | TRANSMISSION TASK START STATE | TRANSMISSION TASK COMPLETION STATE | JOB COMPLETION STATE |
|---|---|---|---|---|---|---|---|---|
| TRANSITION DESTINATION STATUS | | | | | | | | — 113j |
| FUNCTION ATTRIBUTE | 0: SUPPORTABLE | 0: SUPPORTABLE | 0: SUPPORTABLE | 0: SUPPORTABLE | 0: SUPPORTABLE | 0: SUPPORTABLE | 0: SUPPORTABLE | 0: SUPPORTABLE |

WF TYPE: SCANNING+FILE SERVER STORAGE — 113c

| | JOB START STATE | SCAN TASK START STATE | SCAN TASK COMPLETION STATE | PREVIEW TASK START STATE | PREVIEW TASK COMPLETION STATE | TRANSMISSION TASK START STATE | TRANSMISSION TASK COMPLETION STATE | JOB COMPLETION STATE |
|---|---|---|---|---|---|---|---|---|
| TRANSITION DESTINATION STATUS | | | | | | | | — 113k |
| FUNCTION ATTRIBUTE | 0: SUPPORTABLE | 0: SUPPORTABLE | 0: SUPPORTABLE | 0: SUPPORTABLE | 0: SUPPORTABLE | 0: SUPPORTABLE | 0: SUPPORTABLE | 0: SUPPORTABLE |

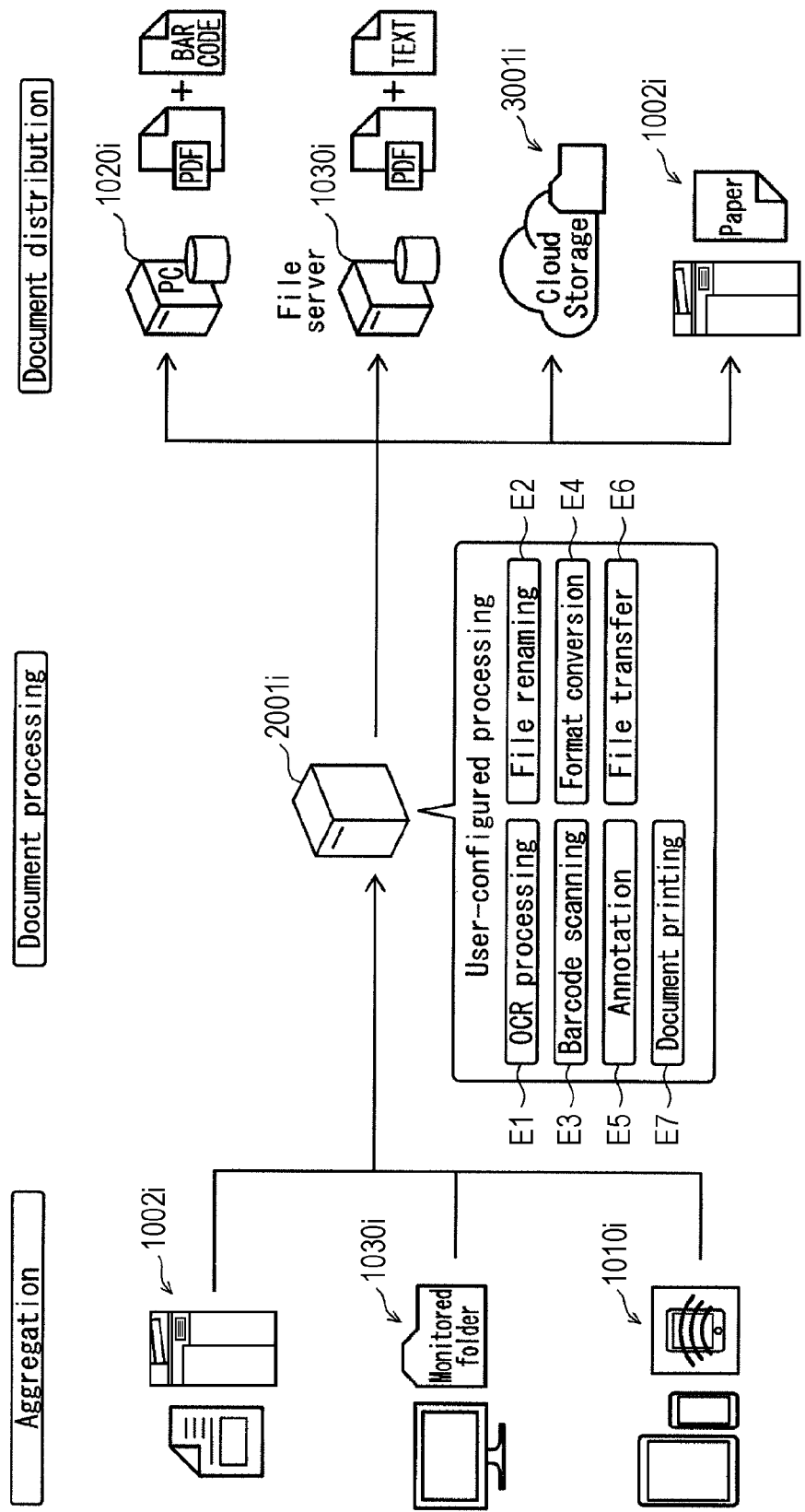

INTEGRATED WORKFLOW EXECUTION CONTROL THAT SWITCHES DISPLAY TO FIRST SCREEN OR SECOND SCREEN BASED ON DETERMINATION CRITERION

CROSS-REFERENCE TO RELATED APPLICATION

The entire disclosure of Japanese patent Application No. 2018-235587, filed on Dec. 17, 2018, is incorporated herein by reference.

BACKGROUND

Technical Field

The present invention relates to an integrated apparatus integrating an image processing apparatus such as a multifunction peripheral (MFP) for executing a job related to a document image and an Information Technology (IT) processing apparatus that is an IT device or the like, and more particularly, to improvement in the case of sharing a display operation device between the image processing apparatus and the IT processing apparatus.

Description of the Related Art

In offices in urban areas, minimization of a space occupied by devices such as an MFP and an IT device has been strongly demanded. As a device that can meet such a demand, there is an integrated apparatus in which MFP cabinets are stacked and integrated in a rack housing IT devices. In the integrated apparatus mentioned above, the MFP has an advantage in functions directed to a sheet face, such as scanning and printing. Meanwhile, the IT device has an advantage in providing functions of storing a large amount of data, optical character recognition (OCR), artificial intelligence (AI), and the like.

In recent years, there has been provided a service in which workflows combining the advantageous functions of the MFP and the advantageous functions of the IT device are registered in a server (called a workflow server) on a network beforehand and the MFP and the IT device are caused to execute those workflows via the network. A conventional MFP based on the use of a workflow has a server function, and an application (MFP application) serving as a communication window with the server is installed. A conventional MFP operates the MFP application for performing a window process of the workflow to link the workflow server and the MFP, thereby executing the workflow.

Further, one disclosed in JP 2018-93360 A has been known as a prior art of the integrated apparatus integrating the MFP and the IT device. The integrated apparatus disclosed in JP 2018-93360 A is configured in such a manner that a common operation display displays a screen generated by an MFP and a screen generated by an IT device. In the integrated apparatus disclosed in JP 2018-93360 A, whether to display a screen of the MFP or to display a screen of the IT device is switched depending on a manual operation made on the operation display.

In the conventional MFP, the MFP application serving as a communication window with the workflow server displays a user interface (UI) screen of the workflow on an operation panel of the MFP, and receives operation necessary for executing the workflow. In other words, in a conventional workflow service, the MFP displays all UI screens necessary for executing a job.

Meanwhile, in the integrated apparatus mentioned above, it has been considered that an application installed in an IT device performs a process as a workflow service window. That is, an application to serve as a workflow window (the application is referred to as an IT device application) is installed in the IT device integrated with the MFP in advance, and the IT device application is launched to start MFP functions at the time of using the workflow. According to such an aspect, it becomes possible to automatically execute a workflow combining functions provided by the MFP and functions provided by the IT device.

However, in an attempt to completely covering the functions and UI screens provided by the MFP with the IT device application, an enormous amount of man-hours is required for development of the IT device application. An MFP is capable of exerting a wide range of functions from basic functions to minor functions to be infrequently used, whereby, for example, 4000 UI screens are used to accept various operations in each function. In an attempt to install the same number of UI screens in the IT device application to use them for a series of software development processes such as debugging and testing, an MFP manufacturer is required to invest a large amount of development costs for product development of the IT device application in addition to the development costs for the MFP. Such double investment in development costs may impose a large burden on manufacturers, which may result in management difficulties.

Note that, an idea of substituting an error screen created by an MFP manufacturer while an application provided from the outside of the device does not support an MFP error can be found in JP H10-124760 A. JP H10-124760 A discloses an MFP that implements switching from a vender application screen to a manufacturer application screen while abnormal operation of the MFP occurs during operation of a vendor application (application developed by a third vendor).

However, the externally obtained vendor application in JP H10-124760 A operates on the MFP together with a manufacturer application, and does not perform, like the integrated apparatus mentioned above, interactive control with a user as a partner instead of the MFP. Since the vendor application disclosed in JP H10-124760 A does not cover all functions of the MFP, even if JP H10-124760 A is referred to, allowing the IT device to function as a workflow server window are not solved.

SUMMARY

One or more embodiments of the present invention provide an integrated apparatus capable of advancing job execution with operation mainly based on interactive control using an application of an IT device while suppressing an increase in man-hours required for development.

An integrated apparatus of one or more embodiments that includes an image processing apparatus (e.g., multifunction peripheral (MFP)) and an IT processing apparatus (e.g., IT device) and causes a common display operation panel to selectively display a first screen (e.g., MFP screen) generated by the image processing apparatus and a second screen (e.g., OS) generated by the IT processing apparatus, and the integrated apparatus of one or more embodiments comprises: an acquisition part (e.g., interface) that obtains a workflow combining a job to be executed by the image processing apparatus and a job to be executed by the IT processing apparatus; an application controller (e.g., hard disk drive (HDD)) that launches an application for control by the workflow and causes each of the image processing apparatus and the IT processing apparatus to execute individual jobs indicated in the workflow; and a switching controller that switches, in accordance with a determination criterion (e.g., function attribute table) related to a function exhibited by the image processing apparatus, display by the display operation panel at a time when the job to be executed by the image processing apparatus in the workflow is executed to either the first screen or the second screen.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6A illustrates an exemplary function attribute table created in association with a job type of a scan preview command according to one or more embodiments;

FIG. 6B illustrates a preview screen that is an MFP screen created by a preview task according to one or more embodiments;

FIG. 12 illustrates an exemplary function attribute table according to a first variation of one or more embodiments;

FIG. 13 illustrates an exemplary function attribute table according to a second variation of one or more embodiments;

FIG. 14A illustrates switching from the MFP screen to the IT device screen performed by a switching operation button according to one or more embodiments;

FIG. 14B illustrates the switching operation button in a grayed out state according to one or more embodiments;

FIG. 15 illustrates an exemplary database of the function attribute table according to one or more embodiments;

FIG. 16 illustrates an exemplary programming graphical user interface (GUI) for workflow description according to one or more embodiments.

DETAILED DESCRIPTION

Hereinafter, embodiments of a job execution control system will be described with reference to the drawings. However, the scope of the invention is not limited to the disclosed embodiments.

Figure 1:
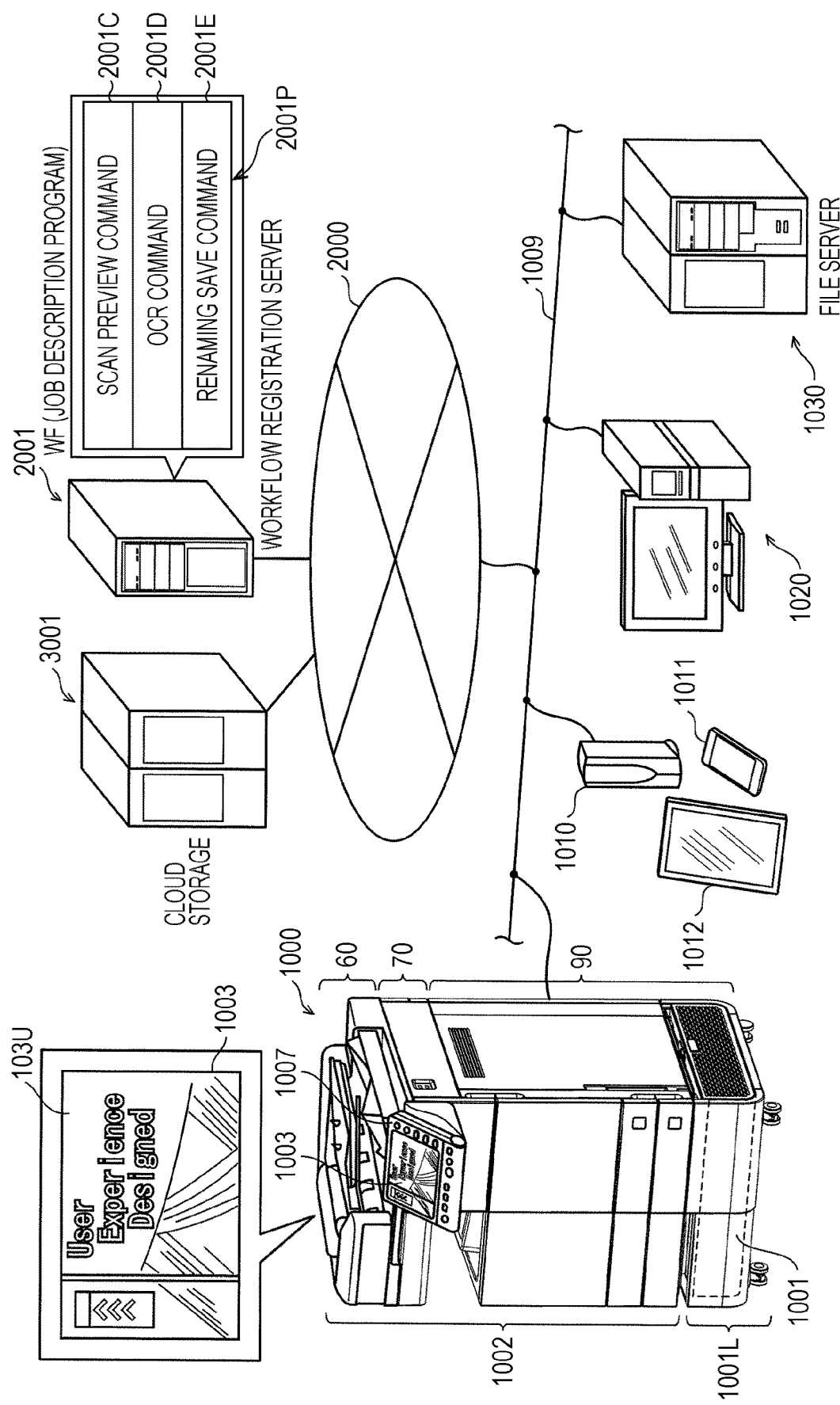
FIG. 1 is a configuration diagram illustrating a network configuration of a job execution control system according to one or more embodiments.

[1] A schematic diagram 1 of a workflow execution service is a configuration diagram illustrating a network configuration of the job execution control system. As illustrated in FIG. 1, the job execution control system includes an integrated apparatus 1000, a wireless local area network (LAN) base unit 1010, a smartphone 1011, a tablet 1012, a personal computer (PC) 1020, a file server 1030, a workflow registration server 2001, and a cloud storage 3001.

1-1) Workflow Registration Server 2001

The workflow registration server 2001 is an external server device serving as a providing entity of a workflow service, which accepts registration of a plurality of workflows. A workflow is a program described using a job description language, which includes one or more job commands. There are three types of job commands including a command for ordering image collection (collection job), a command for ordering processing of collected images (processing job), and a command for ordering distribution of processed images (distribution job).

One or more collection methods of the collection job can be selected from a plurality of collection methods, such as reading of a document sheet face using the MFP 1002, a file transfer from a storage of the smartphone 1011, a file transfer from a storage of the tablet 1012, and a file transfer from a storage of the PC 1020. Further, one or more distribution methods of the distribution job can be selected from among file storage in the cloud storage 3001, file storage in a storage of the file server 1030, and sheet face printing performed by the MFP 1002.

In FIG. 1, a workflow 2001P, which is a job description program including a scan preview command 2001C, an OCR command 2001D, and a renaming save command 2001E, is registered in the workflow registration server 2001.

The scan preview command 2001C is a command for instructing the MFP 1002 to execute a job combining scanning of a document sheet face performed by the MFP 1002 and a real-time preview of image data obtained by scanning.

The OCR command 2001D instructs the workflow registration server 2001 to perform OCR processing on the image data obtained by the scan preview command 2001C.

The renaming save command 2001E is a command for instructing the cloud storage 3001 and the file server 1030 to perform renaming setting the text string obtained by the OCR processing to be a file name, and causing a storage of the cloud storage 3001 and the file server 1030 to store the renamed file. With the workflow 2001P including such commands being registered in the workflow registration server 2001, the image data obtained by the scanning of the document sheet face performed by the MFP 1002 is stored in the cloud storage 3001 with the file name of the text string obtained by the OCR processing. With the processing procedure including a plurality of jobs being registered in the workflow registration server 2001, work required for material storage and the like can be automated.

[2] Configuration of IT Device 1001

Figure 2:
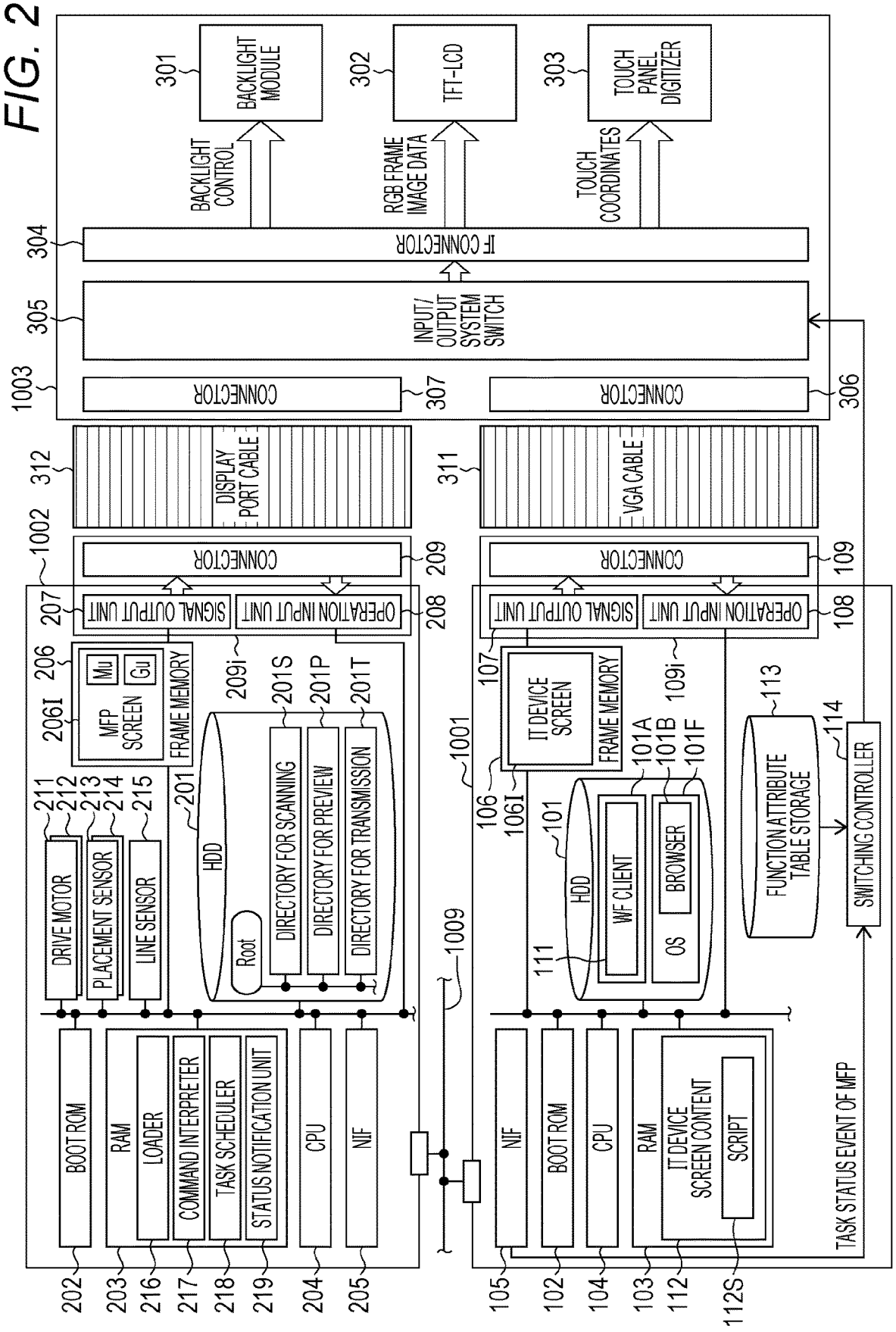
FIG. 2 is a configuration diagram illustrating internal configurations of an IT device, an MFP, and a touch panel display according to one or more embodiments.

The integrated apparatus 1000 is an integrated machine in which the MFP 1002 is loaded on top of a rack 1001L housing the IT device 1001. The integrated apparatus 1000 as an integrated machine provides both the functions of the MFP 1002 and the functions of the IT device 1001 through the touch panel display 1003 that is a common GUI device. FIG. 2 is a configuration diagram illustrating internal configurations of the IT device 1001, the MFP 1002, and the touch panel display 1003.

The IT device 1001 is a device serving as a workflow service window, which includes hardware elements and software elements of a general architecture of a computer system. Specifically, the IT device 1001 includes a hard disk drive (HDD) 101 (including an operating system (OS) 101F, an application 101A, a browser 101B, and a WF client application 111), a boot read-only memory (ROM) 102, a random access memory (RAM) 103, a central processing unit (CPU) 104, a network IF 105, an IT device screen frame memory 106, a signal output unit 107, an operation input unit 108, a connector 109, a WF client application 111, an IT device screen content 112, a function attribute table storage 113, and a switching controller 114. Note that the following description will be given taking a scan preview command as an example of a job directed to the MFP 1002.

2-1) HDD 101

The HDD 101 is a built-in medium in which the OS 101F and a plurality of applications 101A that operate on the OS 101F are installed. As one of the plurality of applications 101A, the WF client application 111 is installed in the HDD 101. The IT device 1001 starts the OS 101F, and then launch the WF client application 111, thereby executing a window process necessary for the workflow service.

2-2) Boot ROM 102

The boot ROM 102 stores a boot program for executing bootstrap from the HDD 101.

2-3) RAM 103

In the RAM 103, the IT device screen content 112, the OS 101F read from the HDD 101, and program codes constituting the multiple applications 101A are loaded.

2-4) CPU 104

The CPU 104 fetches, decodes, and executes the program codes constituting the applications 101A loaded to the RAM 103.

2-5) Network IF (NIF in FIG. 2) 105

The network IF 105 includes a network interface card, and establishes a logical connection based on a hypertext transfer protocol (HTTP) with the MFP 1002 and the IT device 1001 through a protocol stack such as a physical layer, a data link layer, and a transmission control protocol (TCP)/user datagram protocol (UDP) layer. Connection establishment and transmission control performed by the network interface 105 are carried out on the basis of the HTTP. With the communication between applications via such a connection being executed, the MFP 1002 can be instructed to execute necessary processing even in a situation where input/output of the touch panel display 1003 is switched to the side of the IT device 1001. In addition to the communication with the MFP 1002, transmission control or connection with the workflow registration server 2001 are also carried out in accordance with the HTTP.

2-6) IT Device Screen Frame Memory 106

The IT device screen frame memory 106 stores pixel data for one screen included in an IT device screen 106I that is an operation screen of the WF client application 111 and a desktop screen of the OS 101F.

2-7) Signal Output Unit 107

The signal output unit 107 generates horizontal synchronization signals and vertical synchronization signals, and generates, in synchronization with those signals, video signals by reading out the pixels stored in the IT device screen frame memory 106. The video signals generated in such a manner are output to the touch panel display 1003 via the connector 109 and a video graphics array (VGA) cable 311.

2-8) Operation Input Unit 108

The operation input unit 108 inputs operation signals output from the touch panel display 1003 via the VGA cable 311 and an input/output system switch 305, and outputs, to the CPU 104, interrupt signals indicating the operation content as operation signals indicating user operation made on the touch panel display 1003.

2-9) Connector 109

The connector 109 is a core part of an interface 109i of the IT device 1001, which serves to perform connection using the VGA cable 311, to perform signal output of the signal output unit 107, and to perform signal input of the operation input unit 108.

The main hardware elements of the IT device 1001 has been described above. Note that the WF client application 111, the IT device screen content 112, the function attribute table storage 113, and the switching controller 114 will be described in detail later.

[3] MFP 1002

The multifunction peripheral (MFP) 1002 executes, among a plurality of jobs indicated in the workflow (job description program) registered in the workflow registration server 2001, a job related to reading of document images and a job related to printing of document images.

In a similar manner to the IT device 1001, the MFP 1002 includes, as constituent elements, hardware elements (a HDD 201, a boot ROM 202, a RAM 203, a CPU 204, a network IF 205, an MFP screen frame memory 206, a signal output unit 207, an operation input unit 208, and a connector 209) of a general architecture of a computer system. In addition to those hardware elements, there is included a drive motor 211, a drive motor 212, a placement sensor 213, a placement sensor 214, and a line sensor 215 as constituent elements for reading documents.

Figure 3:
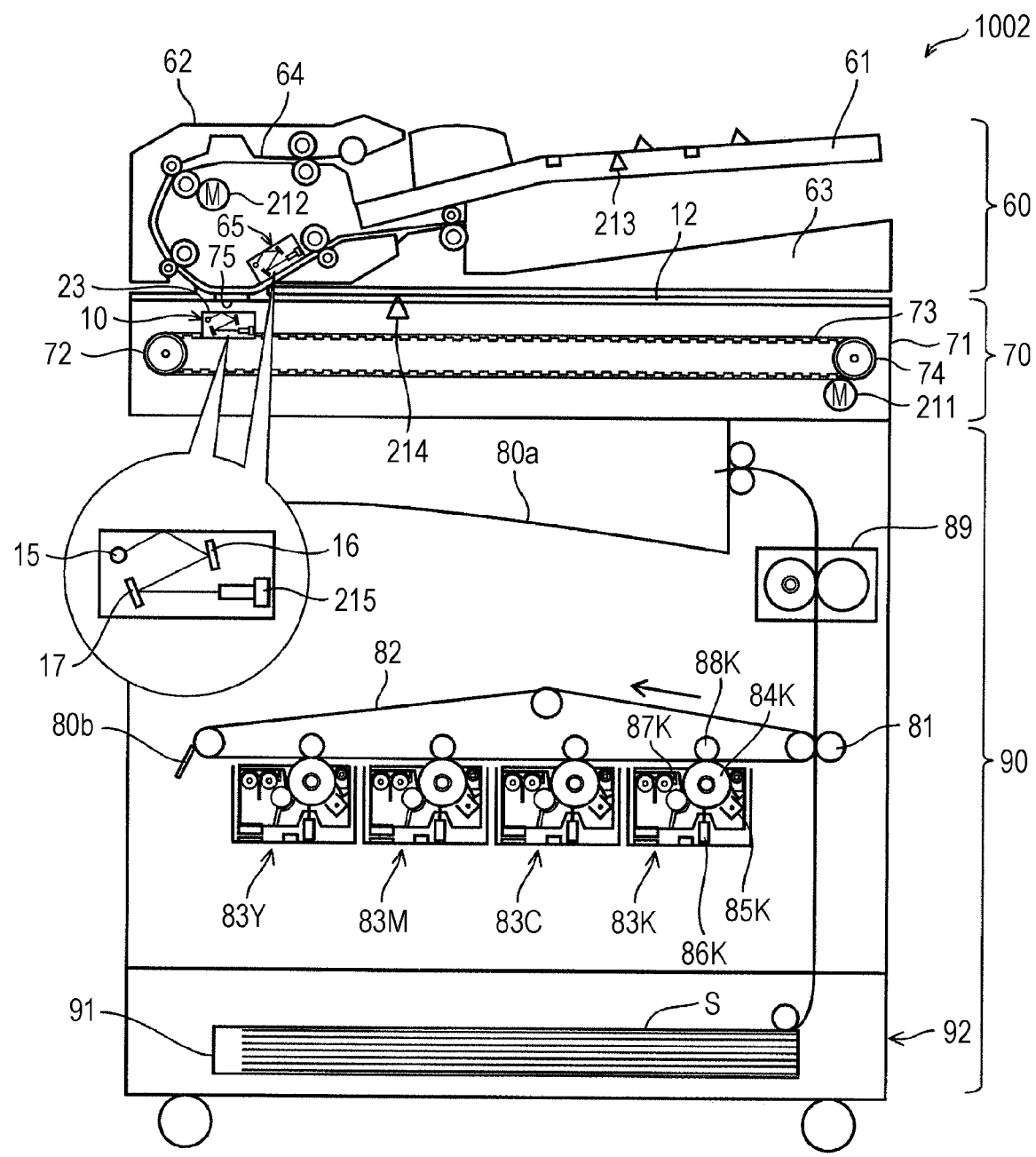
FIG. 3 illustrates a cross-sectional configuration of the MFP according to one or more embodiments.

In the cross-sectional configuration of the MFP 1002 illustrated in FIG. 3, the drive motor 211, the drive motor 212, the placement sensors 213 and 214, and the line sensor 215 cause placement of a document, conveyance of a document, movement of a scan unit 10, and the like. Hereinafter, the drive motor 211, the drive motor 212, the placement sensor 213, the placement sensor 214, and the line sensor 215 will be described with reference to FIG. 3.

3-1) Drive Motor 211

The drive motor 211 circulates and drives a timing belt 73 stretched in the horizontal direction by timing pulleys 72 and 74. By this circulation driving, the scan unit 10 attached to the timing belt 73 moves in a right-left direction (sub-scanning direction) in FIG. 3.

3-2) Drive Motor 212

The drive motor 212 conveys a document placed on a document tray 61 of an automatic document feeder (ADF) 60 one by one along a conveying path 64, and causes the document to pass on a strip-shaped slide glass 75.

3-3) Placement Sensor 213

The placement sensor 213 detects the placement of the document on the document tray 61 of the ADF 60.

3-4) Placement Sensor 214

The placement sensor 214 detects the placement of the document on a tabular platen glass 12.

3-5) Line Sensor 215

The line sensor 215 is a sensor element included in the scan unit 10 attached to the timing belt 73 and a scan unit 65 of the ADF 60, which receives, when light from a light-emitting diode (LED) light source 15 is emitted onto the document, light reflected from the document guided by a planar mirror 16 and a planar mirror 17, and outputs read signals.

In addition to those motors and sensors, a plurality of function programs for reading and printing documents is installed in the HDD (HDD 201) of the MFP 1002, and resident software for implementing those function programs in a multitasking execution environment is loaded in the RAM 203. Examples of such resident software for the multitasking execution environment include a loader 216, a command interpreter 217, a task scheduler 218, and a status notification unit 219.

3-6) Loader 216

When the MFP 1002 is activated, the loader 216 loads a function program for scanning, a function program for preview, and a function program for transmission from a directory for scanning 201S, a directory for preview 201P, and a directory for transmission 201T formed in the HDD 201, and generates tasks corresponding to those control programs in the RAM 203. Note that all the generated tasks are in a stopped state at the time when the function programs are loaded. Those tasks do not operate unless they are started by the task scheduler 218.

A task is an application, which includes a group of function programs and screen data referenced from the function programs stored together in each of the directory for scanning 201S, the directory for preview 201P, and the directory for transmission 201T of the HDD 201 (note that an application on the MFP 1002 side is purposely named as a task to clearly indicate that it is to be managed by the task scheduler 218).

3-7) Command Interpreter 217

The command interpreter 217 decodes a job indicated by a job command, and instructs the task scheduler 218 to execute the task corresponding to the decoded job.

3-8) Task Scheduler 218

The task scheduler 218 places, among a plurality of tasks loaded in the RAM 203, a task specified by the job command in a queue, and provides it for sequential execution performed by the CPU 204. In the sequential execution, the task scheduler 218 sequentially starts the tasks at the head of the queue so that they are executed by the CPU 204. Upon completion of the task, the task is stopped and the next-order task in the queue is started. Thereafter, similar processing is repeatedly executed for all tasks included in the job. Furthermore, the task scheduler 218 operates the function program in the active task depending on a plurality of events that occur in the image processing apparatus, thereby causing a task status to transition.

3-9) Status Notification Unit 219

The status notification unit 219 makes notification of push type progress information every time each of a plurality of tasks corresponding to a job makes a status transition of stop→start→in operation→completed→stop. The progress information indicates to which progress stage the job process by the task has reached, which includes an identifier of the task related to the status transition and an identifier of the task status of the transition destination. The notification of the progress information is directed to the switching controller (to be described later) 114 of the IT device 1001. Since the HTTP connection is established by the network interface 105, the status notification unit 219 executes inter-application communication using a web application programming interface (WebAPI). With the WebAPI, applications developed in different programming languages can be linked, and the status notification unit 219 can notify various applications of a task execution status.

[4] Touch Panel Display 1003

The touch panel display 1003 includes a backlight module 301, a thin-film-transistor liquid-crystal display (TFT-LCD) 302, a touch panel digitizer 303, an IF connector 304, an input/output system switch 305, a connector 306 of a VGA cable 311, and a connector 307 of a display port cable 312.

Connection between the IF connector 304 and the connectors 306 and 307 via the input/output system switch 305 is alternative, and the other end of the connection of the IF connector 304 is switched to either the connector 306 or 307, whereby the pixel supply source for the TFT-LCD 302 is switched to either the IT device screen frame memory 106 or the MFP screen frame memory 206. Switching of the connection partner performed by the input/output system switch 305 is carried out in accordance with the control of the switching controller 114 (component of the IT device 1001) to be described later.

[5] Components of IT Device 1001 for Screen Switching

Next, components (WF client application 111, IT device screen content 112, function attribute table storage 113, and switching controller 114) of the IT device 1001 related to screen control will be described.

5-1) WF Client Application 111

The WF client application 111 is a program to server as a window for using the integrated apparatus 1000 in the workflow service, which downloads the IT device screen content 112 from the workflow registration server 2001 prior to execution of the job description program by the workflow registration server 2001.

Further, the WF client application 111 carries out application synchronization with the task started by the task scheduler 218 as a counterpart. Specifically, the WF client application 111 has a management code for synchronization control, and receives notification of various events that have occurred in the MFP 1002 using a synchronization session. Therefore, the WF client application 111 can know sheet detection by the placement sensors 213 and 214, and can instruct the drive motors 211 and 212 to perform drive control. Furthermore, a user operation made on the IT device screen content 112 can be notified to the task operating under the control of the task scheduler 218.

5-2) IT Device Screen Content 112

The IT device screen content 112 includes a script 112S incorporated therein, and is created using a page description language and a markup language. In order to enable application synchronization with the WF client application 111, it includes the same number of UI screens as the UI screens created by the task of the MFP 1002 and the IT device screen content 112, and further includes the same number of operation members (operational items such as icons) same as the operation members of the UI screens created by the task of the MFP 1002 except for a part thereof. The script 112S causes the browser 101B of the OS 101F to execute page switching and acceptance of operation made on the UI screen. Further, the script 112S executes a support process for operating the task at the time of causing the MFP 1002 to execute the job registered in the workflow service. The support process is a process for writing, in the IT device screen frame memory 106, pixel data of the IT device screen 106I with the content equivalent to an MFP screen 206I created by the task of the MFP 1002, and for prompting a user to input operation similar to that made on the MFP screen 206I of the MFP 1002. When the user operation is made on the IT device screen 106I, the script 112S transmits an event indicating the user operation to the MFP 1002 through a connection established in a wired LAN 1009. Application synchronization is made possible by the operation event being transmitted through the wired LAN 1009 instead of the operation input from the touch panel display 1003, and the task scheduler 218 can change a status of each task in the MFP 1002 in response to the operation of the touch panel display 1003 in the same manner as directly receiving the operation from the touch panel display 1003.

The IT device screen 106I provided for display by the IT device screen content 112 is a user experience (UX) design screen. The UX design screen is a screen devised in terms of a design and a layout to impress the experience of using the device. The IT device screen content 112 for displaying the UX design screen is periodically updated, and is provided for distribution by the workflow registration server 2001.

5-3) Function Attribute Table Storage 113

The function attribute table storage 113 stores a function attribute table in association with a plurality of types of workflows. The function attribute table indicates each status of a plurality of tasks or processes included in a job in association with a function attribute. The function attribute is a 1-bit flag, and when it is set to a bit value of "0", it indicates that the function performed in the corresponding task status is supported by the IT device screen content 112 and switching of the screen is not required during display of the IT device screen 106I. When it is set to a bit value of "1", it indicates that the function performed in the corresponding task status is not supported by the IT device screen content 112 and switching to the MFP screen 206I is required during display of the IT device screen 106I.

5-4) Switching Controller 114

When status transition of a series of tasks is notified through the wired LAN 1009, the switching controller 114 reads a function attribute corresponding to the notified status after the transition from the function attribute table, and instructs the input/output system switch 305 of the touch panel display 1003 to switch input/output according to the content of the function attribute.

The function program loaded to the RAM 203 by the loader 216 as a component of the task of the MFP 1002 includes a program for exhibiting basic functions and a program other than that (program for exhibiting minor functions). The basic functions indicate functions commonly installed in many models and are likely to be installed in the future. On the other hand, the minor functions indicate functions installed only in some models and are uncertain about whether they are installed in future models or whose cost-effectiveness of installation is uncertain. Some MFP screens 206I include a message unique to the minor functions (Mu in FIG. 2) and an operation member unique to the minor functions (Gu in FIG. 2). The message Mu (notification content) unique to the minor functions is a message not presented on the IT device screen 112I displayed or presented by the IT device screen content 112 or the like, which should be notified to the user. Further, the operation member Gu unique to the minor functions is a UI component that accepts input of a user operation that is not accepted on the IT device screen 112I displayed by the IT device screen content 112 and is necessary for using the minor functions. Since such an operation member does not exist on the IT device screen of the IT device screen content 112, it hinders application synchronization performed by the WF client application 111. This is because an operation event directed to an operation member not existing in the IT device screen content 112 hinders the application synchronization performed by the WF client application 111.

In view of the above, while the function attribute of the task status corresponding to the minor functions is set to be unsupportable, which means absence of function support, the switching controller 114 instructs the input/output system switch 305 of the touch panel display 1003 to switch the connection destination of the IF connector 304 to the connector 307 of the MFP 1002 at the stage where the task execution proceeds to the task status. Accordingly, the MFP screen 206I including the message Mu unique to the minor functions and the operation member Gu unique to the minor functions is displayed on the touch panel display 1003. By performing the switching as described above, task execution by the task scheduler 218 can be smoothly proceeded regardless of whether the function attribute indicates supportable/unsupportable, i.e., regardless of presence of the function support.

Note that job termination is set on the IT device screen of the touch panel display 1003 by the switching controller 114 regardless of the setting of the function attribute. Such job termination includes job termination due to job deletion with occurrence of an error during the job, termination due to job cancellation, and task termination without function support.

[6] Description of Operation

Operation of the integrated apparatus 1000 having a configuration as described above will be described.

6-1) Loading and Starting of Each Task

Figure 4A:
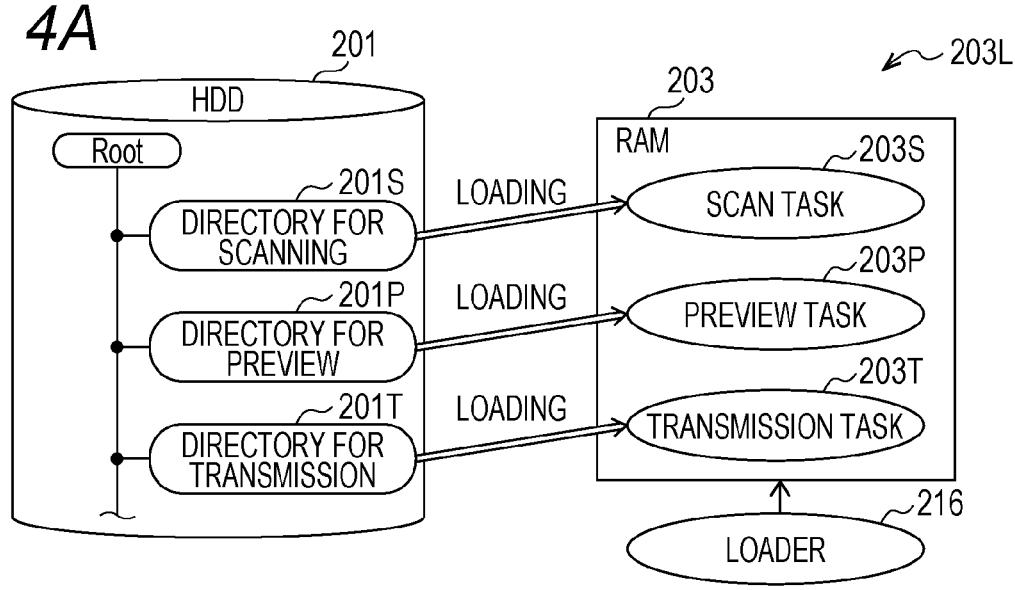
FIG. 4A illustrates loading of a task performed by a loader according to one or more embodiments.

Hereinafter, loading of a task performed by the loader 216, command interpretation by the command interpreter 217, and task execution by the task scheduler 218 will be described with reference to FIGS. 4A and 4B. As illustrated in FIG. 4A, task loading performed by the loader 216 is carried out prior to user authentication 2001A performed by the workflow registration server 2001 after the MFP 1002 is activated. As illustrated in FIG. 4A, when the MFP 1002 is activated, the loader 216 reads program codes and data from the directory for scanning 201S, the directory for preview 201P, and the directory for transmission 201T of the HDD 101, and loads them into the RAM 203. As a result, the scan task 203S, the preview task 203P, and the transmission task 203T are obtained in the RAM 203.

Meanwhile, the command interpretation by the command interpreter 217 and the task starting by the task scheduler 218 are performed after the process from the user authentication 2001A to workflow selection 1001S. FIG. 4B illustrates a processing sequence indicating a processing process up to the workflow selection. In the sequence of FIG. 4B, the user authentication 2001A is performed after transmission 2001U of the IT device screen content 112 is performed. The user authentication 2001A includes access request transmission 1001A from the WF client application 111 to the workflow registration server 2001, login request transmission 2001L as a response to the request, and username and password transmission 1001P as a response to the login request.

After the validity of the user is confirmed in such user authentication, a workflow to be executed is specified through workflow list display transmission 2001W, and the workflow selection 1001S performed by the WF client application 111.

The workflow to be executed is specified in this manner, whereby a command (scan preview command) for instructing the MFP 1002 to perform processing in the workflow is issued in the MFP 1002 (see 2001J).

When the scan preview command is issued, the command interpreter 217 interprets the scan preview command and specifies the scan task 203S, the preview task 203P, and the transmission task 203T as tasks corresponding to the command. The task scheduler 218 provides the scan task 203S, the preview task 203P, and the transmission task 203T having been specified as tasks corresponding to the scan preview command to execution of the CPU 204 performed by the MFP 1002. The task execution by the task scheduler 218 is expressed by a state transition model 213M. The state transition model 213M is subject to the execution by the CPU 204 in the execution order of the scan task 203S as a first order, the preview task 203P as a second order, and the transmission task 203T as a third order.

The scan task 203S, the preview task 203P, the transmission task 203T to be started in FIG. 4B will be described.

The scan task 203S starts to drive the drive motor 211 and the drive motor 212 in response to detection of document placement by the placement sensors 213 and 214. Further, a document image is generated from read signals from the line sensor 215 and encoded, compressed image data is obtained, and a file including the compressed image data is written in the HDD 201.

The preview task 203P reads out the compressed image data file written in the HDD 201, generates a preview image, and accepts user operation related to a density change, a size change, a rotation setting, and an aggregation setting. The preview task 203P adjusts the image data according to the changed density and size and the set rotation angle. Then, the adjusted image data is compressed again, and is written in the HDD 201.

The transmission task 203T transfers, using a file transfer protocol (FTP) or a server message block (SMB), the compressed image data stored in the HDD 201 to the workflow registration server 2001. The scan task 203S, the preview task 203P, and the transmission task 203T generate a UI screen (MFP screen 206I in FIG. 2) according to the job execution progress, and write the pixel data in the MFP screen frame memory 206. With the MFP screen being provided to display on the touch panel display 1003, display of a message necessary for a task progress and reception of user operation are performed.

6-2) Launch and Operation of WF Client Application 111

Figure 5A:
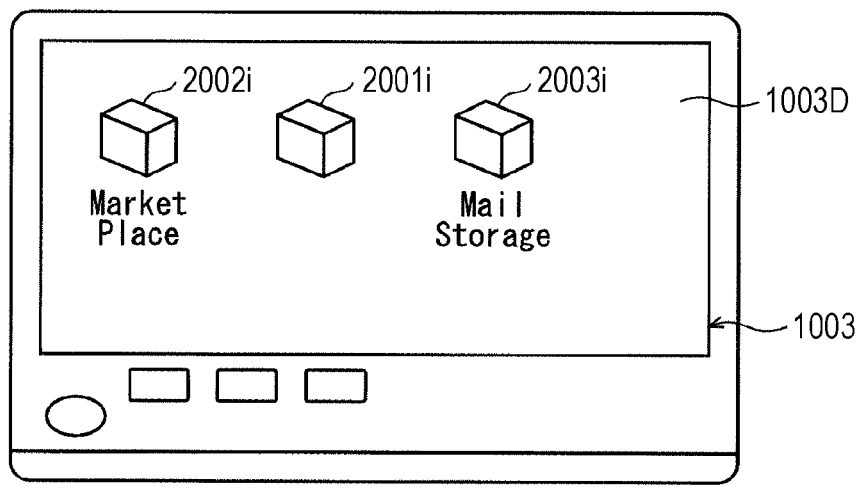
FIG. 5A illustrates an exemplary desktop screen displayed on the touch panel display when the IT device is activated according to one or more embodiments.

When the IT device 1001 is activated, the display content of the touch panel display 1003 becomes a desktop screen 1003D illustrated in FIG. 5A. On the desktop screen, an icon 2001i of the workflow registration server 2001 is touched to launch the WF client application 111. The launched WF client application 111 issues an access request to the website of the workflow registration server 2001.

Figure 4B:
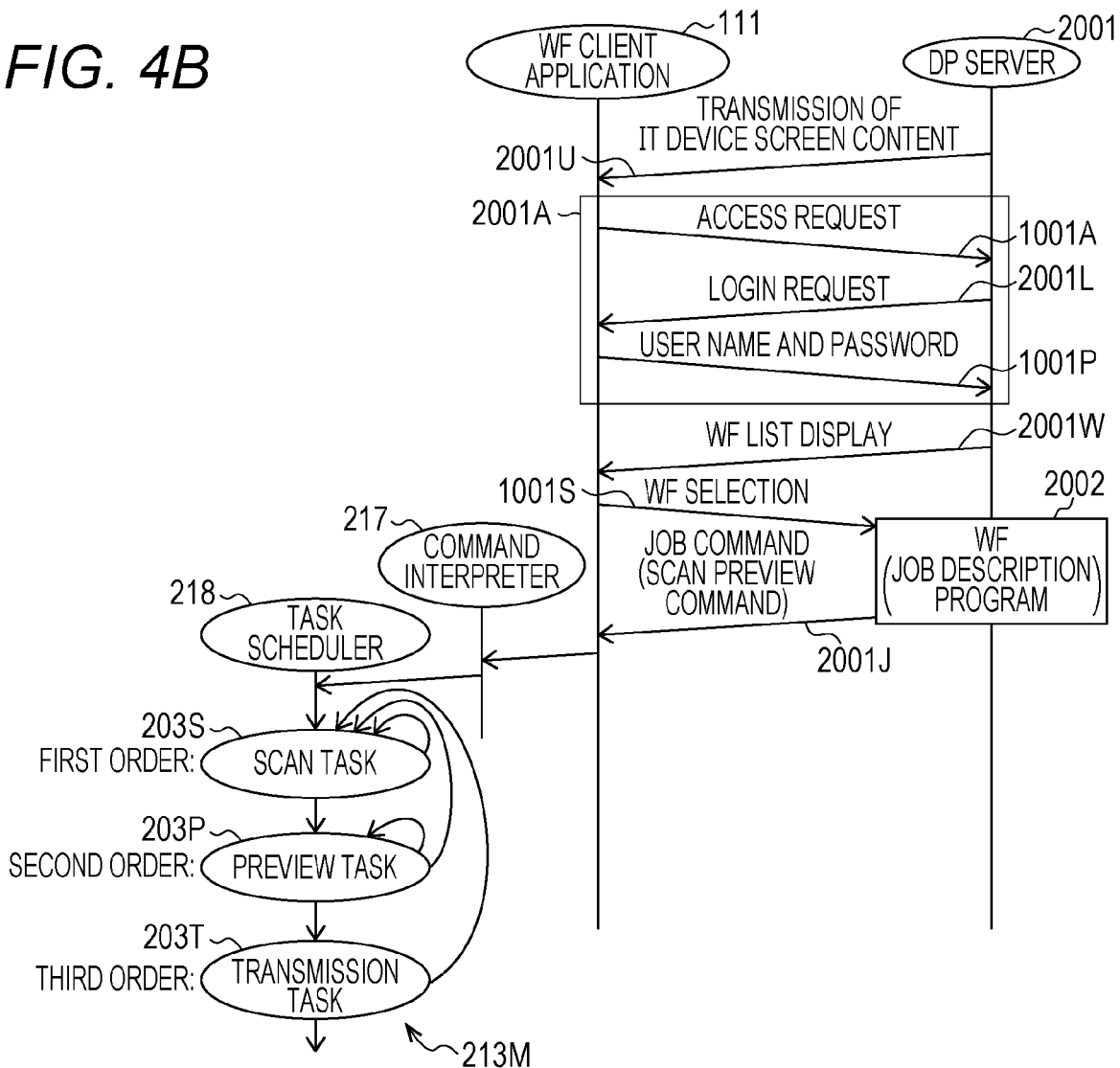
FIG. 4B illustrates a command interpretation performed by a command interpreter, and task execution performed by a task scheduler according to one or more embodiments.
Figure 5B:
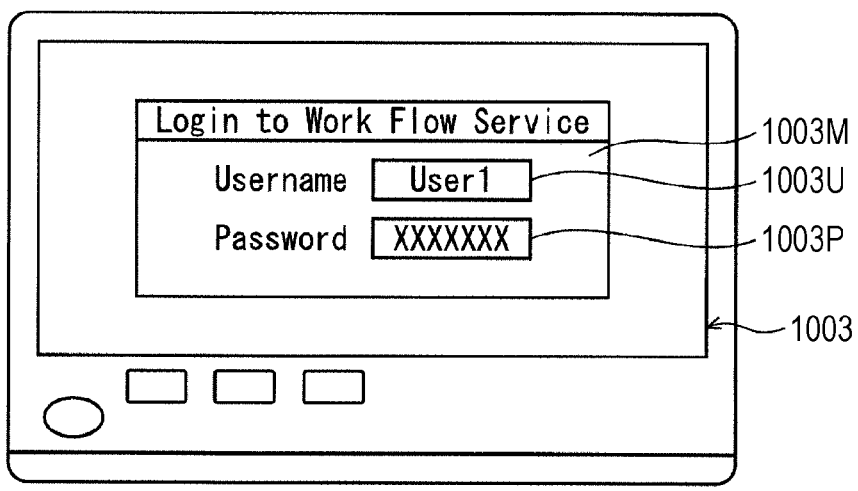
FIG. 5B illustrates a login menu used for user authentication according to one or more embodiments.

Transmission of this access request causes the user authentication 2001A illustrated in FIG. 4B to start. FIG. 5B illustrates a login menu used for the user authentication 2001A. A login menu 1003M includes a username input field 1003U and a password input field 1003P, and receives input of a username (User 1 in the drawing) and a password (XXXXXXX in the drawing).

Figure 5C:
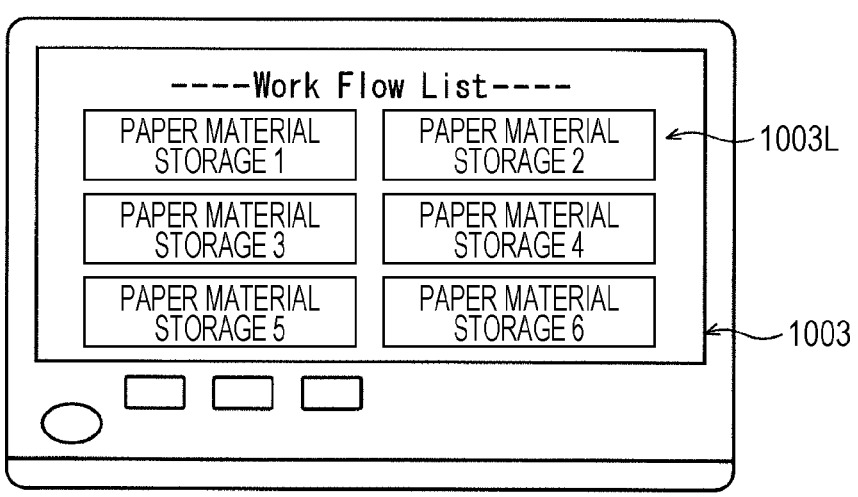
FIG. 5C illustrates a list display of a workflow registered for a login user according to one or more embodiments.

When the user account is confirmed on the basis of the received username and the password and login is performed, the workflow registration server 2001 displays a list of workflows registered for the login user as illustrated in FIG. 5C. In the example of FIG. 5C, a workflow list display screen 1003L presents six workflows of paper material storage 1 to 6, and accepts selection of any one of the workflows. It is assumed that one of the workflows is selected through the workflow list display screen, and a scan preview command is issued.

6-3) Exemplary Setting of Function Attribute Table

FIG. 6A illustrates an exemplary function attribute table created in association with a job type of the scan preview command. The exemplary function attribute table in FIG. 6A includes a job start state J1, a start state S1 and a completion state C1 of the scan task 203S, a start state S2 and a completion state C2 of the preview task 203P, a start state S3 and a completion state C3 of the transmission task 203T, and a job completion state J2, each of which is indicated in association with function attributes indicating "0" or "1".

In the function attribute table having such content, the function attribute indicating "1" is associated with the start state S2 and the completion state C2 of the preview task 203P. Each of the states other than those (the job start state J1, the start state S1 and the completion state C1 of the scan task 203S, the start state S3 and the completion state C3 of the transmission task 203T, and the job completion state J2) is in association with the function attribute indicating "0".

The reason why the function attribute is set to be unsupportable in the start state S2 and the completion state C2 of the preview task 203P is that the preview task 203P exhibits a real-time preview function. At the time of exhibiting the real-time preview function, the MFP 1002 writes pixel data of the MFP screen (preview screen 206P) as illustrated in FIG. 6B in the MFP screen frame memory 206. When imaging of the read signals obtained by scanning is complete and previewing is performed, the real-time preview function displays a density change GUI 206D, a size change GUI 206S, a rotation setting GUI 206R, and a Nin1 aggregation setting GUI 206X, and adjusts the image data in accordance with the change input and setting input made on them. Adjustment of the image data starts by the real-time preview function, and in the case of waiting for any user input, operation using the IT device screen content 112 may not be controlled. That is, while any minor function is activated and a user operation required to proceed with the minor function is awaited, the entire job proceeding may be delayed due to the state of waiting for the minor function operation.

Since there is such a concern, in the exemplary function attribute table in FIG. 6A mentioned above, the function attribute corresponding to the start state S2 and the completion state C2 of the preview task 203P is set to "1: unsupportable".

6-4) Job Execution by Task Scheduler 218

Figure 7:
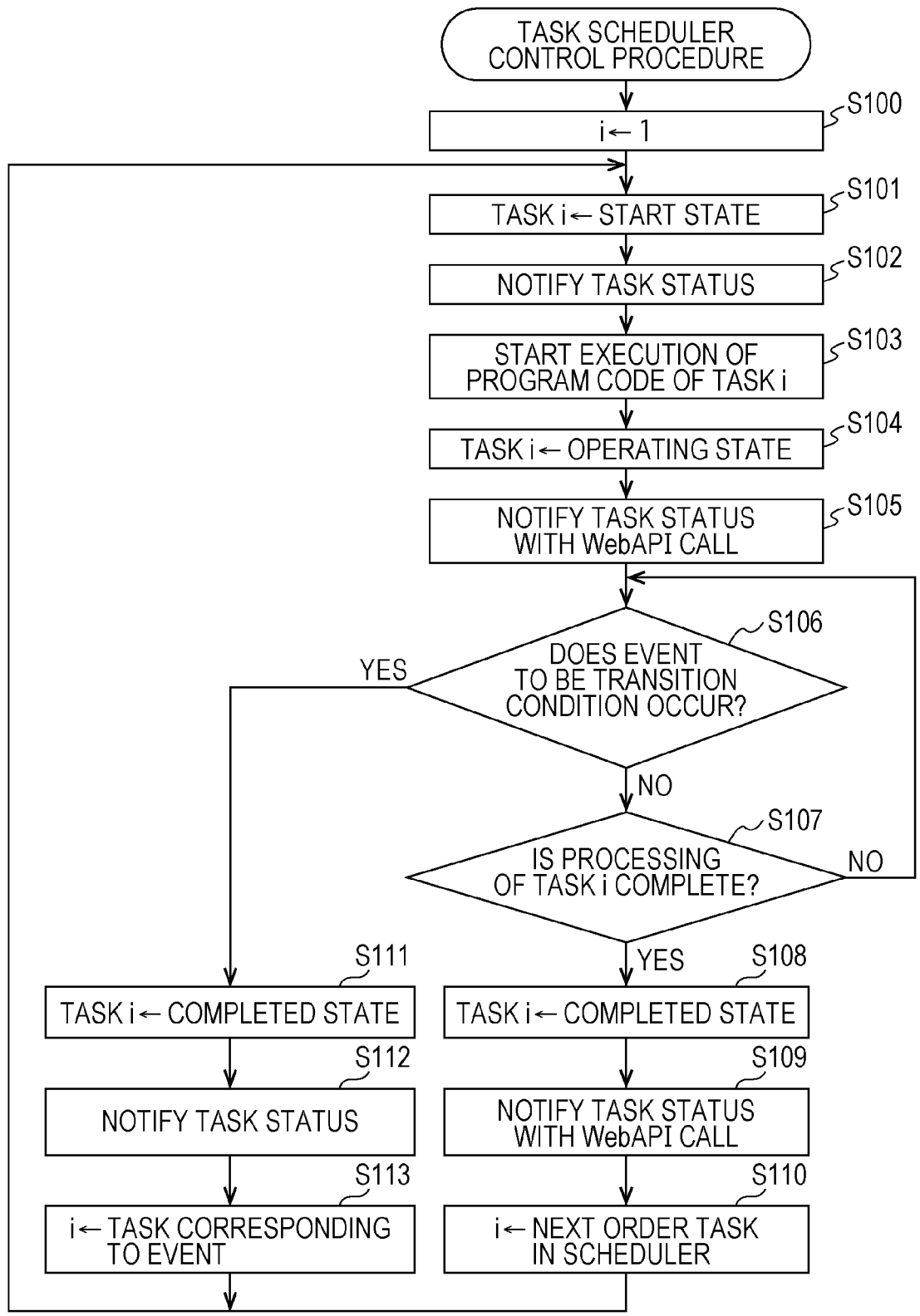
FIG. 7 is a flowchart illustrating a control procedure of the task scheduler according to one or more embodiments.

The control procedure by the task scheduler 218 is as illustrated in the flowchart of FIG. 7.

A variable i in the present flowchart is a variable indicating the current processing order (current task) among a plurality of tasks provided to the queue of the task scheduler 218. In FIG. 7, first, the variable i is set to 1 (step S100), a task i is set to a start state (step S101), and the status notification unit 219 makes notification of a task status by a WebAPI call (step S102). Thereafter, execution of the program code of the function program of the task i starts (step S103). The task i is set to an operating state (step S104), and the WebAPI is called to make notification of the task status (step S105).

Thereafter, the process waits for determination on whether an event to be a transition condition occurs (step S106) and whether execution of the program code included in the function program of the task i is complete (step S107).

When the execution of the program code included in the task i is complete (Yes in step S107), the task i is set to a completion state (step S108), notification of the task status is made by the WebAPI call (step S109), and a task of the next order in the task scheduler 218 is set to the task i (step S110). Subsequently, the process returns to step S101.

When the event to be the transition condition occurs (Yes in step S106), the task i is set to a completion state (step S111), and notification of the task status is made (step S112). Subsequently, the task corresponding to the event is set to the task i (step S113), and the process returns to step S101.

6-5) Processing Content of Each Task

Figure 8A:
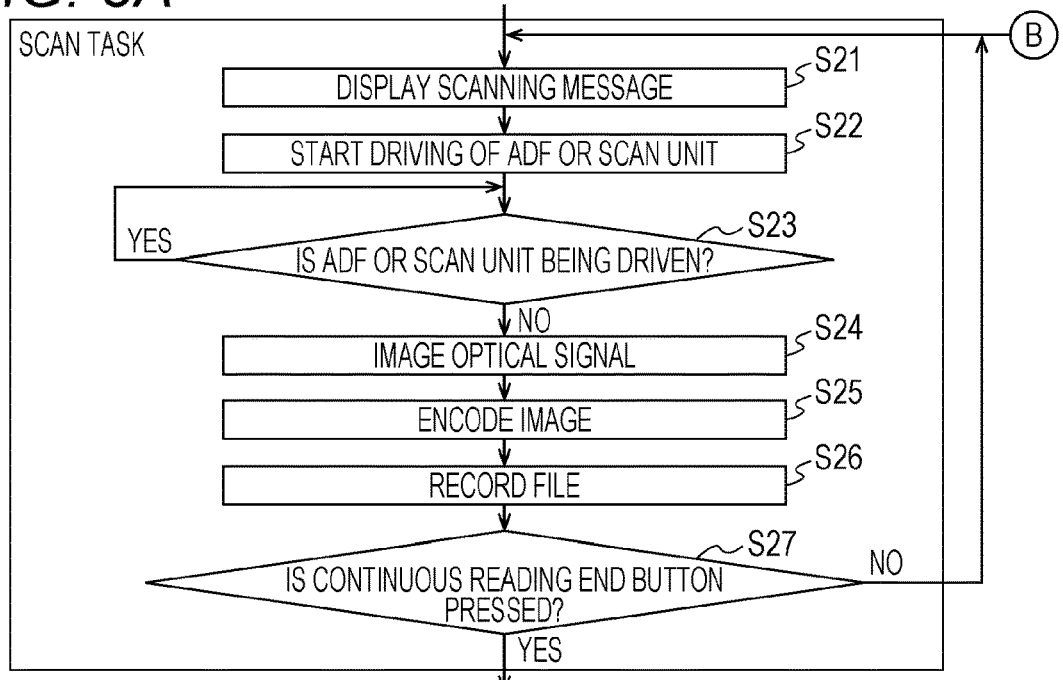
FIG. 8A is a flowchart illustrating a processing procedure of a scan task according to one or more embodiments.
Figure 9:
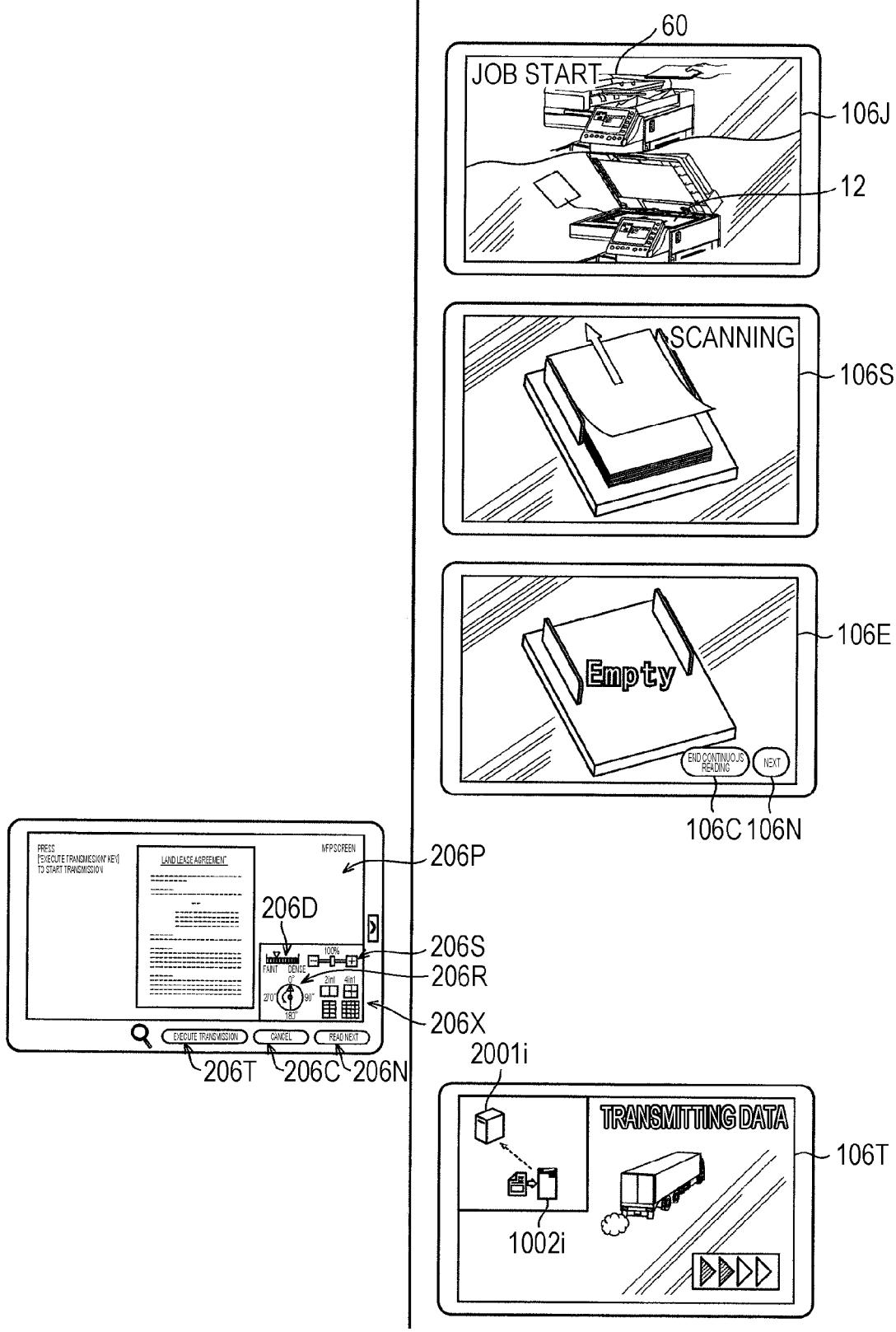
FIG. 9 illustrates an exemplary MFP screen and an IT device screen displayed on the touch panel display according to one or more embodiments.

FIG. 8A is a flowchart illustrating a processing procedure of the scan task 203S. When the job corresponding to the scan preview command starts, the IT device screen content 112 writes the pixels of a job selection screen 106J in FIG. 9 in the IT device screen frame memory 106. The job selection screen 106J indicates that a document is to be set on the ADF 60 or a document is to be set on the platen glass 12 of the MFP 1002. When a document is set, the pixels of a scanning message display screen 106S illustrated in FIG. 9 are written in the IT device screen frame memory 106 (step S21). The scanning message display screen 106S indicates the state where the document set on the ADF 60 is fed one by one. Subsequently, driving of the ADF 60 or the scan unit 10 is started (step S22). Thereafter, it waits for the driving of the ADF 60 or the scan unit 10 to stop (step S23). When all documents set by the user are read, and the driving of the ADF 60 or the scan unit 10 is stopped (No in step S23), the optical signals obtained by the driving are imaged, and uncompressed image data is obtained (step S24). Then, the image data is encoded to obtain compressed image data (step S25), and the IT device screen content 112 writes a file containing the compressed image data in the HDD 201 (step S26), and writes a scan completion screen 106E in the IT device screen frame memory 106. The scan completion screen 106E illustrates a state in which all the documents set on the ADF 60 are fed out and the ADF 60 is empty. At this stage, the IT device screen content 112 displays a continuous reading end button 106C illustrated in FIG. 9. The continuous reading end button 106C is a button for requesting confirmation whether to perform continuous reading or to end reading to proceed to the next task (step S27). If the next document is set on the ADF 60 or on the platen glass 12 without pressing the continuous reading end button 106C (No in step S27), the process returns to step S21 to execute continuous reading.

If the next document is not set and the continuous reading end button 106C is pressed (Yes in step S27), the execution of the scan task 203S is complete.

Figure 8B:
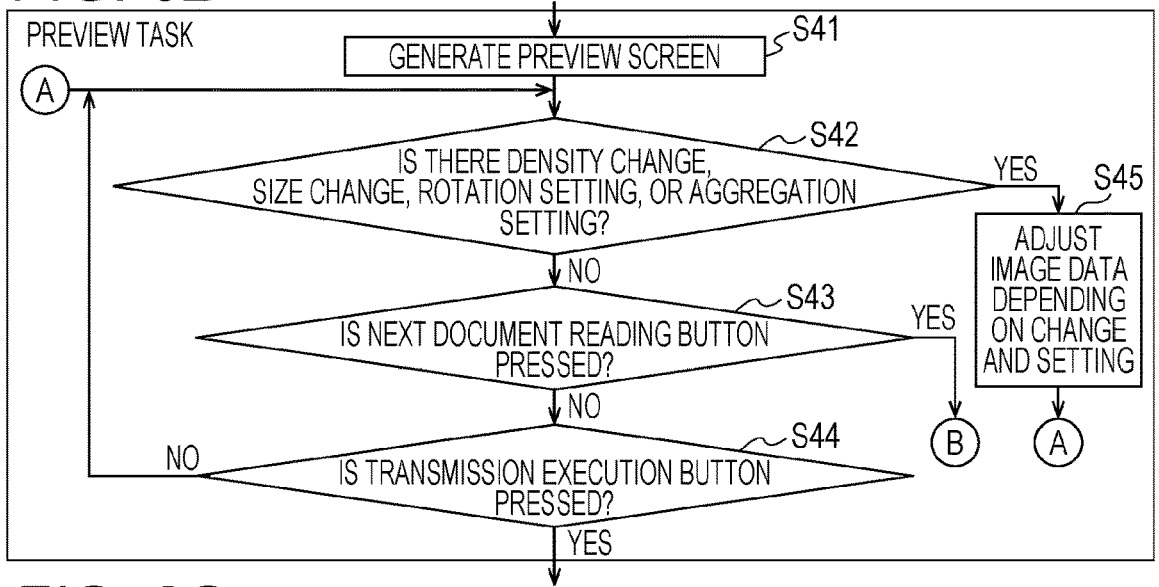
FIG. 8B is a flowchart illustrating a processing procedure of the preview task according to one or more embodiments.

FIG. 8B is a flowchart illustrating a processing procedure of the preview task 203P. In the present flowchart, first, the preview task 203P generates the preview screen 206P illustrated in FIG. 6B and writes it in the MFP screen frame memory 206 of the MFP 1002 (step S41). In addition to the GUI described above, the preview screen 206P includes a transmission execution button 206T for receiving transmission execution, a cancellation button 206C for receiving job cancellation, and a next document reading button 206N for receiving next reading. Then, it waits for any of the operation of the density change GUI 206D, the size change GUI 206S, the rotation setting GUI 206R, or the aggregation setting GUI 206X (step S42), pressing of the next document reading button 206N (step S43), or pressing of the transmission execution button 206T (step S44) to be carried out (steps S42 to S44). When operation related to the density change, the size change, the rotation setting, or the aggregation setting is performed (Yes in step S42), the generated image data is adjusted depending on the change or setting (step S45), and the process returns to the loop of steps S42 to S44. When the next document reading button 206N is pressed (Yes in step S43), the operation of the preview task 203P is completed or paused. Subsequently, the scan task 203S is started again.

Figure 8C:
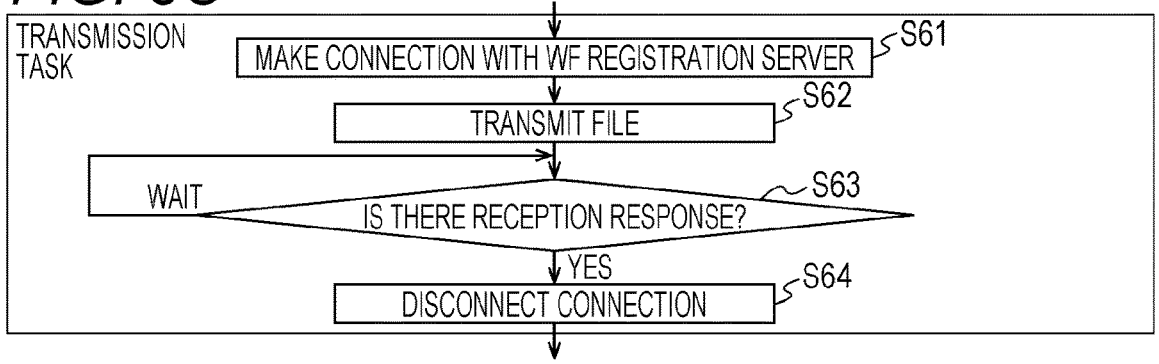
FIG. 8C is a flowchart illustrating a processing procedure performed in a transmission task according to one or more embodiments.

FIG. 8C is a flowchart illustrating a processing procedure performed in the transmission task 203T. A connection is made with the workflow registration server 2001 (step S61), and a file storing the compressed image data is transmitted (step S62). At this time, a transmitting screen 106T in FIG. 9 is displayed. The transmitting screen 106T shows the workflow server icon 2001i and the MFP icon 1002i, and indicates that transmission from the MFP 1002 to the workflow registration server 2001 is performed.

Subsequently, it enters a state of waiting for a reception response from the workflow registration server 2001 (step S63), and when there is a reception response, the connection with the workflow registration server 2001 is disconnected (step S64).

6-6) Screen Switching by Switching Controller 114

Figure 10:
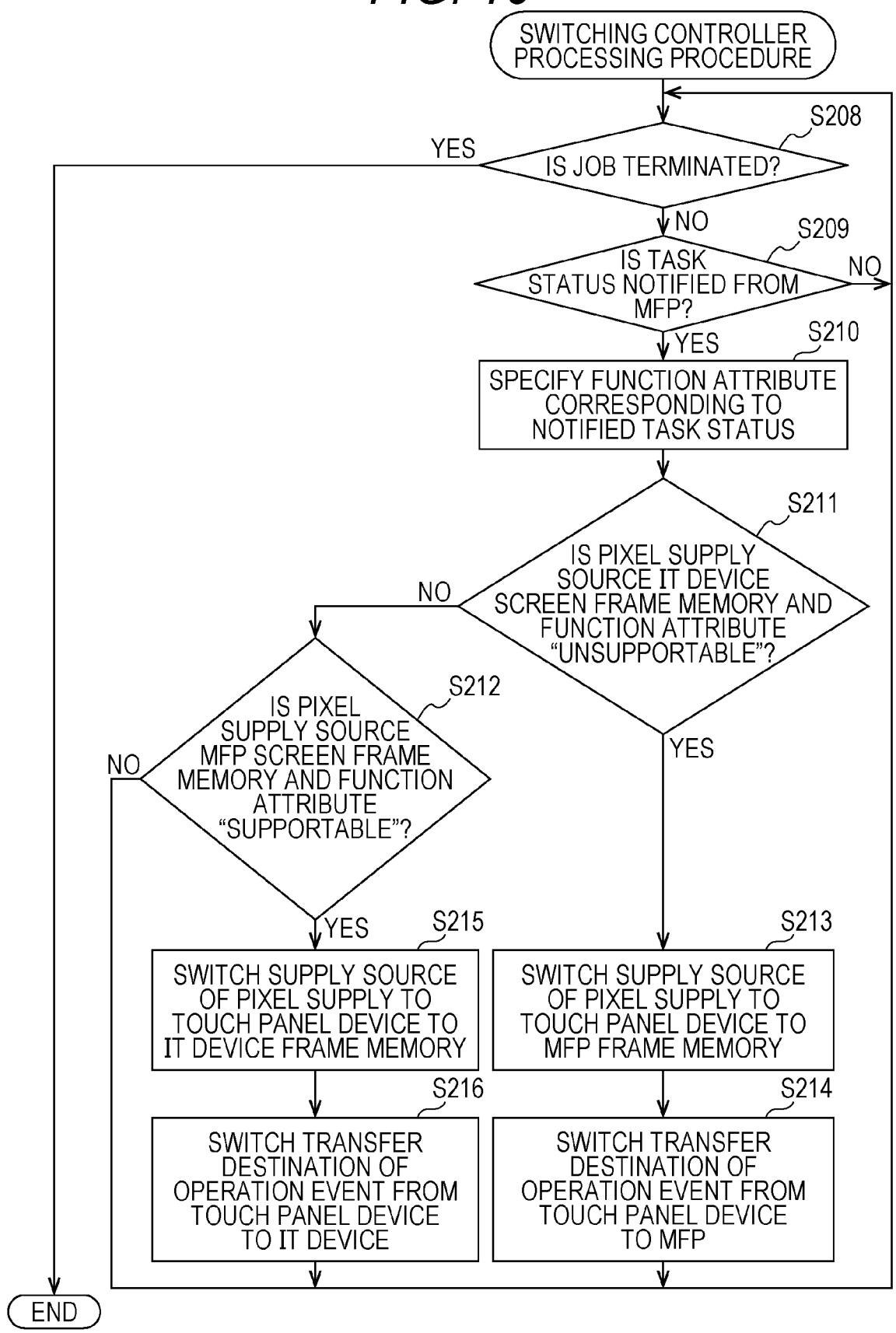
FIG. 10 is a flowchart illustrating a processing procedure of a switching controller according to one or more embodiments.

When the document reading job starts, the switching controller 114 executes the processing procedure illustrated in the flowchart of FIG. 10. The loop including the step S208 and the step S209 in FIG. 10 waits for determination on whether the job is complete (step S208) or whether the transition of the task status is notified from the status notification unit 219 of the MFP 1002 (step S209). If the transition of the task status is notified (Yes in step S209), the function attribute corresponding to the notified status after the transition is specified (step S210), and determination in steps S211 and S212 is performed thereafter.

In step S211, the switching controller 114 determines whether the pixel supply source of the touch panel display 1003 is the IT device screen frame memory 106 and whether the specified function attribute indicates "unsupportable".

In step S212, the switching controller 114 determines whether the pixel supply source of the touch panel display 1003 is the MFP screen frame memory 206 and whether the function attribute specified to correspond to the task status indicates "supportable".

Hereinafter, control content of the switching controller 114 directed to the scan task 203S, the preview task 203P, and the transmission task 203T will be described.

The start state and the completion state of the scan task 203S are associated with the function attribute indicating "supportable". Since the input source of the video signals of the touch panel display 1003 is switched to the side of the IT device 1001, even if notification of the event indicating that the scan task 203S enters a start state or a completion state is made, determination in step S211 is No and step S212 is No, whereby the display content of the touch panel display 1003 is maintained and the pixel supply source is not switched as illustrated in 216A and B of FIG. 11. Accordingly, when the IT device screen content 112 writes the job selection screen 106J, the scanning message display screen 106S, and the scan completion screen 106E illustrated in FIG. 9 in the IT device screen frame memory 106, those screens are provided for display on the touch panel display 1003. Since the start state of the preview task 203P is associated with the function attribute indicating "unsupportable", and the pixel supply source of the touch panel display 1003 is switched to the IT device screen frame memory 106 (Yes in step S211), the supply source of the pixel supply to the touch panel display 1003 is switched to the MFP screen frame memory 206 of the MFP 1002 (step S213). Subsequently, the transfer (output) destination of the operation event from the touch panel display 1003 is switched to the MFP 1002 (step S214).

Figure 11:
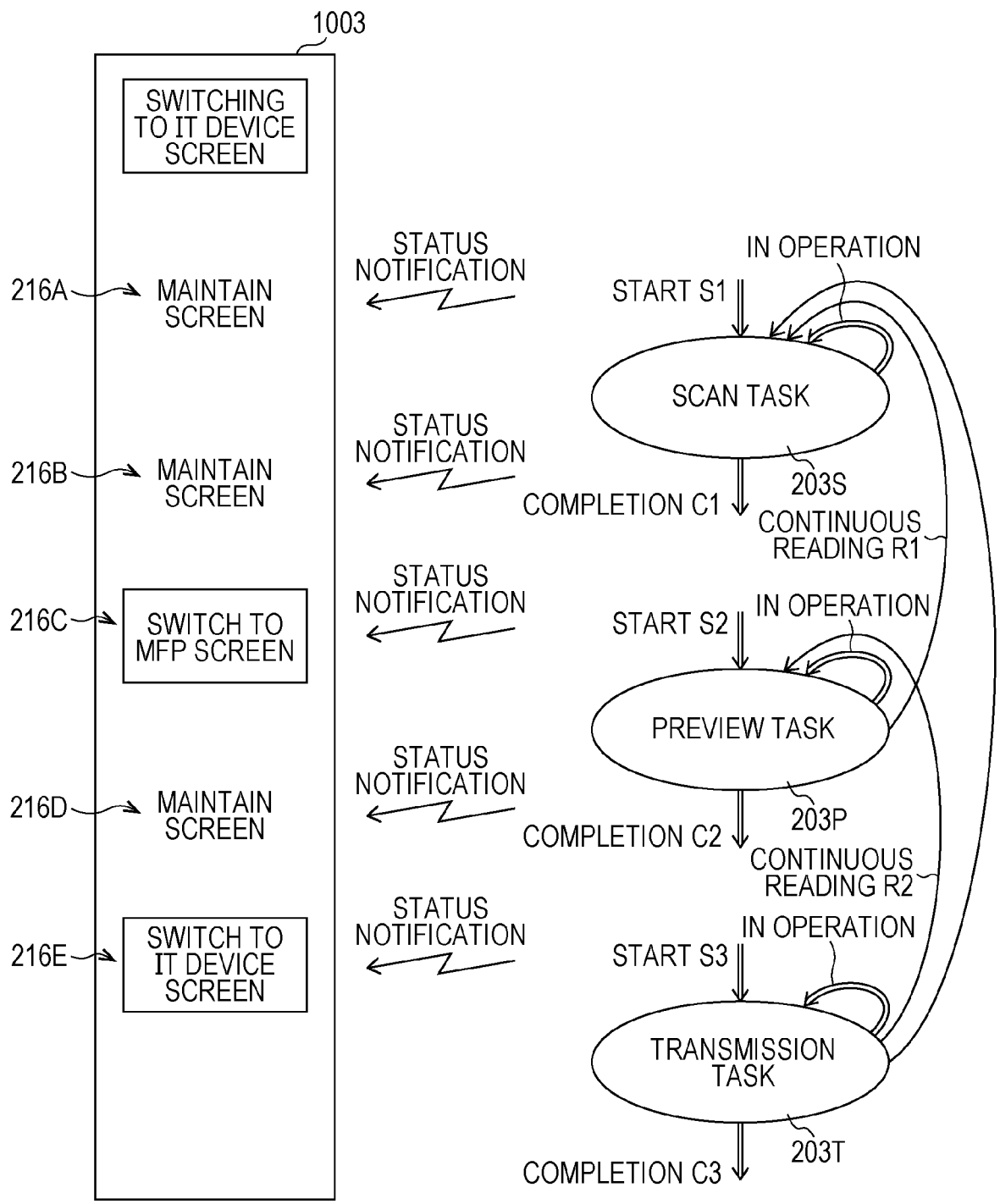
FIG. 11 illustrates a state transition model of the scan task, the preview task, and the transmission task, and transition of display content of the touch panel display accompanying the task state transition according to one or more embodiments.

As a result, the pixel supply source of the touch panel display 1003 is switched to the MFP screen frame memory 206 of the MFP 1002 as illustrated in 216C of FIG. 11, whereby the preview screen 206P of FIG. 9 written in the MFP screen frame memory 206 by the scan task 203S is provided for display on the touch panel display 1003.

In the completion state of the preview task 203P, the MFP screen is displayed and the function attribute indicating "unsupportable" is associated with the completion state of the preview task 203P as illustrated in FIG. 6B, whereby determination in steps S211 and S212 is No, and the process returns to the loop of steps S208 to S209. Accordingly, the touch panel display 1003 maintains the screen content of the MFP screen frame memory 206 of the MFP 1002 as illustrated in 216D in FIG. 11.

As illustrated in FIG. 6A, since the function attribute indicating "supportable" is associated with the start state of the transmission task 203T in the function attribute table and the screen content of the touch panel display 1003 is switched to the preview screen 206P, the determination in Step S211 is No and step S212 is Yes when notification of the event indicating that the transmission task 203T enters a start state is made, and the supply source of the pixel supply to the touch panel display 1003 is switched to the IT device screen frame memory 106 of the IT device 1001 (step S215). Subsequently, the transfer destination of the operation event from the touch panel display 1003 is switched to the IT device 1001 (step S216). Since the pixel supply source of the touch panel display 1003 is switched to the screen content of the IT device screen frame memory 106 of the IT device 1001 as illustrated in 216E of FIG. 11, when the IT device screen content 112 writes the transmitting screen 106T of FIG. 9 in the IT device screen frame memory 106, the transmitting screen 106T is provided for display on the touch panel display 1003.

Note that, when a user operation for returning from the communication task 203T to the preview task 203P as indicated by an arrow R1 in FIG. 11, the switching controller 114 performs switching from the IT device screen to the MFP screen on the basis of the function attribute.

[7] Summary

As described above, according to one or more embodiments, when the function attribute associated with the current task status indicates "supportable", a UI screen equivalent to the UI screen generated by the task is generated by the script 112S of the IT device screen content 112, and is written in the IT device screen frame memory 106. Further, when a user operation is made on the equivalent UI screen, the event indicating the user operation is transmitted to the task scheduler 218 through the connection established by the network IF 105. The task under the control of the task scheduler 218 can proceed with the operation according to the event.

When the function attribute associated with the current task status indicates "unsupportable", the input/output system switch 305 connects the IF connector 304 to the connector 307, and selects the MFP screen frame memory 206 as a pixel supply source of the TFT-LCD 302. Accordingly, the UI screen written in the MFP screen frame memory 206 by the task is provided for display on the touch panel display 1003. Further, with the IF connector 304 being connected to the connector 307, the operation signals indicating the touch coordinates detected by the touch panel digitizer 303 is output to the operation input unit 208 of the MFP 1002. Accordingly, the event for proceeding with the execution of the task is supplied to the task.

With such screen switching, input/output for display and operation necessary for the operation of the minor functions of the image processing apparatus is made without excess or deficiency, whereby the job progress is not interrupted by the operation of the minor functions. In addition, input/output of the MFP 1002 is valid only during a local period from the progress stage in which the function attribute is set to "unsupportable" to the progress stage in which the function attribute is set to "supportable", whereby a situation where a user having an urgent matter interrupts to perform operation of stopping the job or the like so that the execution of the job description program is interrupted does not occur. Therefore, it becomes possible to avoid an error of a person who intends to use the MFP 1002, and to smoothly proceed with the workflow service using the MFP 1002.

[8] Other Variations

Although various embodiments of the present invention have been described above, it is needless to say that the present invention is not limited to the embodiments described above, and the following variations of one or more embodiments can be considered.

(1) In the embodiments above, IDs are assigned to a plurality of states of one job, and a switching screen for each state is defined. Meanwhile, in a first variation of one or more embodiments, the switching controller 114 switches a screen depending on the transition of the screen content of the MFP screen.

In the case of operating under the control of the task scheduler 218, a function program included in each task generates a UI screen necessary for proceeding with a process related to a job. At this time, a status notification unit 219 of the first variation of one or more embodiments outputs, to the switching controller 114, progress information indicating which UI screen is generated by the function program according to the job progress through the connection of the wired LAN 1009.

FIG. 12 illustrates an exemplary function attribute table according to the first variation of one or more embodiments. As illustrated in FIG. 12, there are four types of MFP screens including a job selection screen, a scan reading screen, a preview screen, and a transmitting screen. By associating the function attribute with each of the job selection screen, the scan reading screen, the preview screen, and the transmitting screen, the switching controller 114 is caused to switch the pixel supply source for the touch panel display 1003. When any one of the MFP screens illustrated in FIG. 9 is displayed and switching of the MFP screen occurs, the function attribute related to the changed screen is extracted from the function attribute table, and the input/output system switch 305 of the touch panel display 1003 is caused to change the connection partner of the IF connector 304 on the basis of the function attribute. With such a change, the pixel supply source for the TFT-LCD 302 is switched to either the IT device screen frame memory 106 or the MFP screen frame memory 206, whereby screen switching similar to that in the embodiments described above can be achieved.

(2) In the first variation of one or more embodiments, a plurality of screen states is defined on the MFP screen, and the switching destination by the switching controller 114 is defined in each screen state. Meanwhile, in a second variation of one or more embodiments, one or more in-screen states are defined for each display state of the MFP screen. The function attribute table performs screen switching to the IT device screen or the MFP screen using a display state as a switching unit.

In the case of operating under the control of the task scheduler 218, a function program included in each task generates a UI screen necessary for proceeding with a process related to a job, and changes a display state of the screen depending on the progress of the process related to the job. In the second variation of one or more embodiments, progress information output to the switching controller 114 of the IT device 1001 by the status notification unit 219 indicates what display state the UI screen generated by the task is currently in.

FIG. 13 illustrates an exemplary function attribute table according to the second variation of one or more embodiments. A function attribute table of the present variation of one or more embodiments indicates four screens including a job selection screen, a scan reading screen, a preview screen, and a transmitting screen, and each screen is associated with one or more in-screen states. Specifically, the job selection screen is specified by a display state D11 for displaying a job start message. The scan reading screen is specified by a display state D21 of a scanning message and a display state D22 of a continuous reading confirmation button. The preview screen is specified by a display state D31 for displaying a preview screen generating message and a display state D32 for displaying a transmission execution button and a job cancellation button. The transmitting screen is defined by a display state D41 of a transmitting display message. In the function attribute table of the second variation of one or more embodiments, each of those display states is associated with a function attribute.

When any one of the plurality of screens illustrated in FIG. 9 is displayed and the in-screen display state has changed, the function attribute related to the changed in-screen display state is extracted from the function attribute table, and the input/output system switch 305 of the touch panel display 1003 is caused to change the connection partner of the IF connector 304 on the basis of the function attribute. With such a change, the pixel supply source for the TFT-LCD 302 is switched to either the IT device screen frame memory 106 or the MFP screen frame memory 206, whereby screen switching similar to that in the embodiments described above can be achieved.

(3) A state attribute may be provided in the workflow (job description program) to determine whether the touch panel display 1003 should be switched to the MFP screen or should be switched to the IT device screen depending on the state attribute. The state attribute has a configuration similar to that of the function attribute table, and a function attribute is associated with each of a plurality of task statuses. When the workflow is obtained from the workflow registration server 2001, the function attribute is obtained together, thereby determining whether the touch panel display 1003 should be switched to the MFP screen or should be switched to the IT device screen.

Further, the MFP screen 206I generated by the MFP 1002 may be transmitted to the IT device 1001 to be displayed on the IT device 1001. Although the script 112S of the IT device screen content 112 supports the function of the MFP 1002 in the embodiments described above, it is not limited thereto. Another application installed in the IT device 1001 may support the function of the MFP 1002. The IT device screen content 112 incorporating the script 112S may be installed in the IT device 1001 in advance.

Furthermore, any of the components included in the IT device 1001 may support the function of the MFP 1002. Moreover, although the workflow has been described to be registered in the workflow registration server 2001, it is not limited thereto. It may be registered in the IT device 1001 itself.

(4) Although the service provider (workflow service supplier) has been described to be the workflow registration server 2001, which is a server device existing in an external network, it is not limited thereto. It may be an application installed in a cloud server.

(5) In the embodiments described above, the switching controller 114 determines whether the MFP screen may be or the IT device screen may be as a screen of the current state each time the current state transitions. However, it is not limited thereto. The switching controller 114 may determine whether the MFP screen may be or whether the IT device screen may be each time screen switching is performed manually. FIG. 14A illustrates switching from the MFP screen to the IT device screen performed by a switching operation button 206H. The MFP screen (preview screen 206P) in FIG. 14A includes the button 206H for receiving switching operation to the IT device screen. The switching button 206H receives a switching instruction to switch the pixel supply source of the touch panel display 1003 from the MFP screen frame memory 206 of the MFP 1002 to the IT device screen frame memory 106 of the IT device 1001.

When pressing of the switching button 206H is notified, the switching controller 114 temporarily switch the content of the touch panel display 1003 to the IT device screen as indicated by an arrow 301A at the time when the button is pressed, and in conjunction with that, the switching controller 114 determines whether the function attribute of the current task status indicates "supportable". In the example of FIG. 5A, since the function attribute indicating "unsupportable" is associated with the start state of the preview task 203P, it returns to the MFP screen as indicated by an arrow 301B of FIG. 14A.

(6) A function program may determine whether or not to include the switching button 206H for commanding the switching controller 114 in the MFP screen.

When the progress stage with the function attribute indicating that the function support exists is reached, as illustrated in FIG. 14A, a function program that performs processing of the progress stage writes pixel data of the UI screen including the switching button 206H in the MFP screen frame memory 206. The switching button 206H receives user operation to command the switching controller 114 to issue a screen switching instruction. When pressing of the button is detected, the function program issues a command for instructing the switching controller 114 to switch the pixel supply source.

Meanwhile, when the progress stage with the function attribute indicating that the function support does not exist is reached, the function program does not include an operation member in the UI screen or makes the switching button 206H to be in a grayed out state to be invalidated as illustrated in FIG. 14B.

(7) In the function attribute table storage 113 illustrated in FIG. 2, an information system database capable of searching by workflow type may be constructed. FIG. 15 illustrates an exemplary database of the function attribute table.

The database in this figure includes function attribute tables 113a, 113b, and 113c having different function attribute settings. Those function attribute tables are associated with indexes 113*i*, *j*, and *k* indicating a type of the corresponding workflows. Among those tables, the function attribute table corresponding to the index 113*i* indicates that the start state and the completion state of the preview task 203P are unsupportable in a similar manner to the function attribute table described in the embodiments described above. The function attribute tables corresponding to the indexes 113*j* and *k* indicate that the start state and the completion state of the preview task 203P are supportable. By the function attribute table being stored in association with the index indicating a workflow type, the content of the function attribute indicated in the function attribute table can be defined to have different content according to the type of the workflow.

(8) Although the real-time preview function has been described to be an unsupportable minor function, it is merely an example. While a message corresponding to the real-time preview can be displayed and an event necessary for the real-time preview can be output, the function attribute of the task status corresponding to the real-time preview may be set to "supportable". Furthermore, a function attribute may be set for, not only the real-time preview, other functions exhibited at the time of operating the scan task 203S or the transmission task 203T. Those functions may be as follows.

Destination Input

There are various methods of destination input that are valid at the time of executing a scan preview job, such as selection input from a pre-registered destination, direct input from a soft keyboard, selection input from a transmission history, and input based on a destination search. A function attribute may be set for each of those input methods to define supportability in the IT device screen content 112.

Setting Function of Document Image Quality

A setting function of document image quality receives any setting of text, text/photograph (printed photograph), photograph (printed photograph), faint character document, or copy document. A function attribute may be set for each of those setting items to define supportability in the IT device screen content 112.

Sheet Face Adjustment

In scanning, it is possible to set whether or not to remove show-through and yellowing. Supportability of the removal of show-through and yellowing may be clearly indicated by a function attribute in the function attribute table.

Color Specification

As a color specifying function, any of settings of color, auto color, full color, gray scale, and monochrome binary is possible. Supportability of those setting items may be clearly indicated by a function attribute in the function attribute table.

File Format Specification

As file format specification, any of settings of PDF, compact PDF, PPTX, TIFF, JPEG, XPS, and compact XPS is possible. Supportability of those setting items may be clearly indicated by a function attribute in the function attribute table. While PDF is selected as a file format, it is possible to select whether or not to apply encryption or signature, whether or not to make outline PDF, and whether or not to apply stamp composition. In the case of using stamp composition, it is possible to select whether to use an image stamp or to use a character stamp. Supportability of those selection items and setting items may be clearly indicated by a function attribute in the function attribute table.

Page Setting

As a page setting function, any of settings of a plurality of pages, page division, and batch transmission of all files is possible. Supportability of those setting items may be clearly indicated by a function attribute in the function attribute table. Further, mail transmission or file transmission may be specified as an accompanying item.

Composition of Date/Time, Page Number, and Stamp

A date/time, a page number, and a stamp can be combined to image data obtained by scanning a document. A function attribute may clearly indicate whether or not to combine a date/time, a page number, or a stamp in the function attribute table.

As an output setting from a document, any of single side→single side, single side→double side, double side→single side, double side→double side, and spread direction can be specified. A function attribute may be set for each of those items of output specification to define supportability in the IT device screen content 112.

Specification of Document to be Read

For a document to be read, specification of a type, such as a thin paper document, a Z-folded document, same-width mixture, different-width mixture, a long-length document, and a book document, is accepted. Supportability of those document types may be clearly indicated by a function attribute in the function attribute table.

While a book document is selected as a document type, supportability may be clearly indicated for each of a double-page spread, division, a front/back cover, external document removal, centering, frame erasing, an opening direction document, and fold erasing, or, in the setting of the document size, specification of an A system, a B system, and an inch system, or supportability for each of 8×13, 8K, 16K, and postcards may be clearly indicated in the function attribute table using a function attribute.

Furthermore, supportability of each of page continuous shooting specification, index document specification, whether or not to perform continuous reading, whether or not to perform automatic rotation, and whether or not to perform character reproduction may be clearly indicated by a function attribute in the function attribute table.

(9) Although the function attribute table has been applied to the job in the case where document scanning is specified as a collection method in the job registered in the workflow service, it is not limited thereto. The function attribute table may be applied in the job of the MFP 1002 in the case where sheet face printing is specified as a distribution method.

While printing onto a paper sheet is specified as a distribution method, the MFP 1002 causes a print unit 90 illustrated in FIG. 3 to execute print output onto a paper sheet. Specifically, an image is formed on a recording sheet S on the basis of the image data specified to be printed and output onto a paper sheet in a job command.

The print unit 90 illustrated in FIG. 3 includes an intermediate transfer belt 82 stretched in the horizontal direction, which moves in a circulating manner, and image forming units 83Y, 83M, 83C, and 83K facing the circular movement region under the intermediate transfer belt 82 and arranged in line along the circular movement direction.

The image forming units 83Y, 83M, 83C, and 83K form toner images of yellow (Y), magenta (M), cyan (C), and black (K), respectively. Since those image forming units 83Y, 83M, 83C, and 83K have similar configurations, here, a configuration of only the image forming unit 83K will be described, and descriptions of configurations of the other image forming units 83Y, 83M, and 83C will be omitted.

The image forming unit 83K includes a photoconductor drum 84K, a charger 85K, an exposure unit 86K, and a developing unit 87K. The outer peripheral surface of the photoconductor drum 84K is uniformly charged by the charger 85K.

The exposure unit 86K emits a light beam modulated by drive signals based on the image data of the document or the like read by the scan unit 10, and exposes and scans the outer peripheral surface of the charged photoconductor drum 84K to form an electrostatic latent image.

The electrostatic latent image formed on the outer peripheral surface of the photoconductor drum 84K is developed by the developing unit 87K with toner.

Above the image forming unit 83K, a primary transfer roller 88K is provided at a position facing the photoconductor drum 84K with the intermediate transfer belt 82 interposed therebetween. The primary transfer roller 88K electrostatically transfers the toner image formed on the outer peripheral surface of the photoconductor drum 84K onto the intermediate transfer belt 82.

Corresponding development color images are similarly formed on the intermediate transfer belt 82 by the other image forming units 83Y, 83M, and 83C. The images of the respective colors formed by those image forming units 83Y, 83M, 83C, and 83K are formed at different timings so that they are multiply transferred to the same position on the intermediate transfer belt 82.

A secondary transfer nip through which a recording sheet passes is formed between the intermediate transfer belt 82 and a secondary transfer roller 81. The recording sheets S are fed to the secondary transfer nip one by one from a sheet feeding cassette 91 of a sheet feeder 92.

The secondary transfer roller 81 electrostatically transfers the toner image on the intermediate transfer belt 82 onto the recording sheet S that passes through the secondary transfer nip. The recording sheet S onto which the toner image is transferred is conveyed to a fixing unit 89. The fixing unit 89 fixes the toner image on the recording sheet S by heat application and pressurization, and the recording sheet S having been subject to the fixing is ejected onto a sheet ejection tray 80a.

In the case of the print unit 90 illustrated in FIG. 3, supportability of finishing functions, such as grouping for each finishing page, sorting for each sheet, and sortation, may be clearly indicated by a function attribute in the function attribute table. Furthermore, supportability of stapling, punching, and half-folding may be clearly indicated by a function attribute in the function attribute table. A function attribute may be set for specifying whether a corner of a sheet face is to be subject to stapling or punching or two holes are to be made.

A function attribute may be set for a specified function of a binding margin. Supportability regarding each of specified items, such as left-open binding, right-open binding, top-open binding, and automatic binding, may be clearly indicated by a function attribute in the function attribute table.

(10) Although the state notification of a push system that causes the MFP 1002 to make notification of state transition of each task has been made, it is not limited thereto. What is called polling system state acquisition may be performed. In that case, a current task variable is stored in a specific shared directory in the HDD file system structure or in a specific port that can be accessed by socket connection. The current task variable indicates, among a plurality of tasks included in the job, a status of the currently executed task. The task scheduler 218 updates the current task variable each time the task to be executed transitions. The switching controller 114 reads out the current task variable by accessing the common area or the socket connection, and carries out the control procedure described in the embodiments described above, thereby performing switching to either the MFP screen or the IT device screen.

(11) The WF client application 111 may accept the description of the workflow by interactive operation through the programming GUI as illustrated in FIG. 16. The programming GUI in FIG. 16 presents individual devices belonging to the DP system by icons (icon 1001i of the integrated apparatus 1000, icon 1030i of the file server 1030, icon 1011i of the smartphone 1011, icon 1012i of the tablet 1012, icon 1030i of the file server 1030, icon 3001i of the cloud storage 3001, and icon 1002i of the MFP 1002). The user can select any icon using a stylus 1007.

Further, the programming GUI presents, as processing methods, OCR processing E1, file renaming E2, barcode scanning E3, format conversion E4, annotation E5, file transfer E6, and document printing E7. The collected document images can be processed by a processing method selected from those methods.

Figure 17:
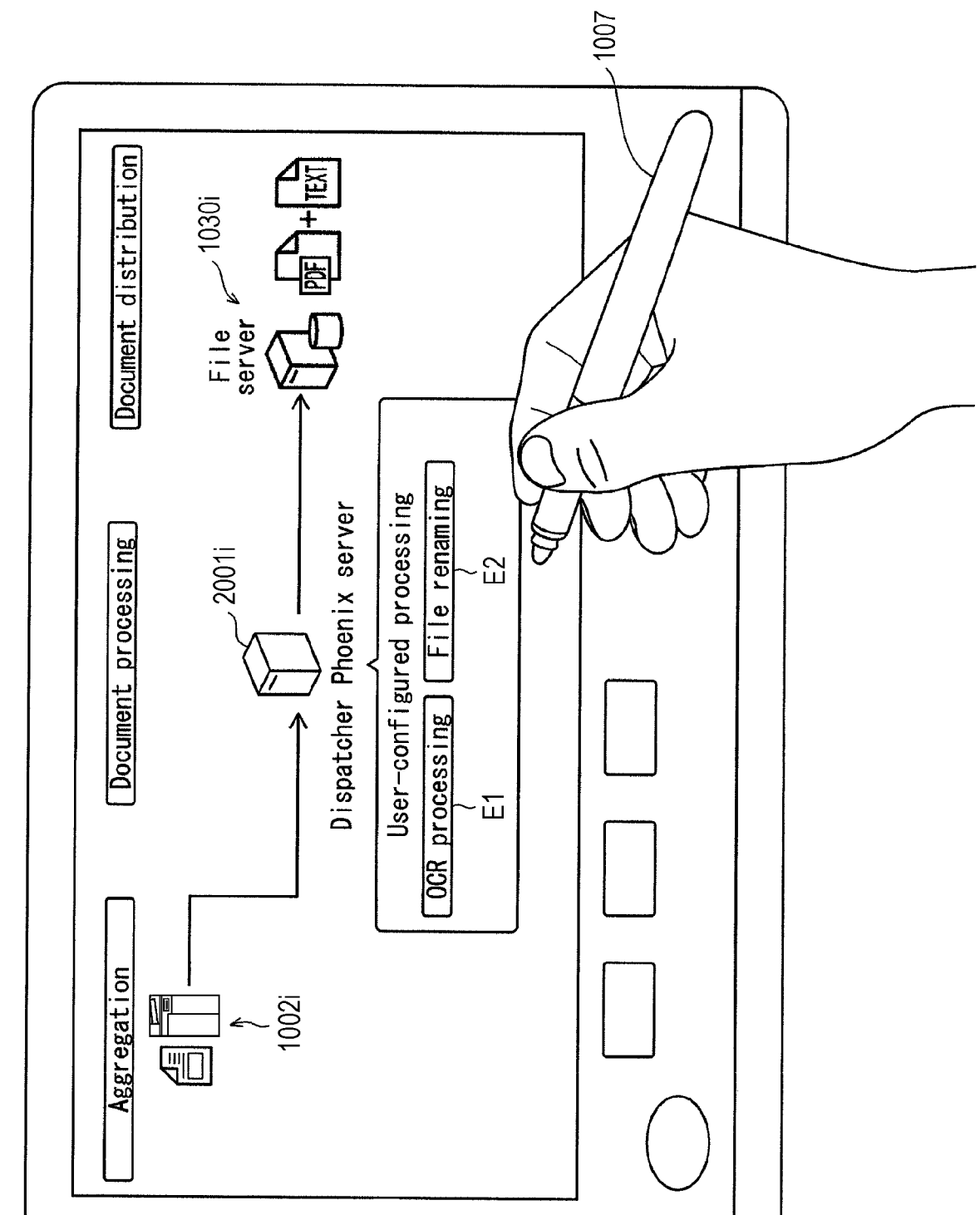
FIG. 17 illustrates an exemplary workflow defined using the programming GUI according to one or more embodiments.

FIG. 17 illustrates an exemplary workflow defined using the programming GUI. The icon 1002i that abstracts the MFP 1002, the icon 2001i that abstracts the workflow registration server 2001, and the icon 1030i that abstracts the file server 1030 are arranged on the screen, and link figures connecting them are arranged. As processing to be performed by the workflow registration server 2001, the OCR processing E1 and the file renaming E2 are selected. When a workflow is defined by those icons and link figures, a job description program indicating the created workflow is registered in the workflow registration server 2001. Note that the workflow created in this manner may include a conditional branch or repeated structure corresponding to an environmental variable.

(12) Although the function attribute table has been described to indicate supportability by the IT device screen content 112, the user may customize the function attribute table. That is, the touch panel display 1003 may receive editing operation from the user, and may update supportability of the task status indicated in the function attribute table in accordance with the editing operation. A user who has been using the MFP screen for many years and has strong control over existence of various minor functions may operate using the MFP screen rather than the IT device screen. For such a user, an editing screen for customization is presented, the touch panel display 1003 is caused to display each of a plurality of task statuses corresponding to the job, and editing operation indicating whether the screen of each task status is to be displayed on the MFP screen or on the IT device screen is received. When the user logs in next time, the display content of the touch panel display 1003 is switched on the basis of the function attribute of the function attribute table customized in such a manner.

(13) In order to display the MFP screen, automatic recognition may be performed on screen data that the MFP 1002 has, and a table automatic creating function for creating a function attribute table according to a result of the automatic recognition may be given to the IT device 1001.

(14) While the MFP screen is provided for display on the touch panel display 1003 according to the function attribute indicated in the function attribute table, a display process for composition of a logo indicating that the workflow is being executed may be performed. Further, a display frame may be provided on the touch panel display 1003, and the MFP screen may be fitted into the frame to be displayed. Furthermore, the MFP screen may be provided for display with its brightness or hue being changed.

The touch panel display 1003 may be caused to perform layer composition of the MFP screen and the IT device screen for display.

(15) Although the descriptions have been made on a device integrating an operation device and a display device, such as the touch panel display 1003, it is not limited thereto. A device in which the operation device and the display device are separated may be used as a display operation device. Furthermore, although the built-in media of the IT device 1001 and the MFP 1002 have been described to be the HDDs 101 and 201, it may be solid state drives (SSDs) as long as they are built-in media.

(16) The MFP screen and the IT device screen illustrated in FIG. 9 are merely examples of a GUI including various widgets in combination. A screen image according to one or more embodiments may be anything as long as it receives operation related to a job.

In an attempt to receive any selection of jobs, function programs included in the IT device screen content 112 and each task use widgets, such as a "toggle button", "radio button", "list box", "slider", "check box", "spin button (drop-down list)", "toolbar", "combo box", "icon", and "tree view", for a configuration of a UI screen.

In an attempt to guide user operation for display of a UI screen, widgets such as a "tab" and a "scroll bar" are used for a configuration of the UI screen.

In an attempt to receive text input from the user, widgets such as a "text box" and "combo box" are used for a configuration of the UI screen.

In the case of providing feedback to the user in response to the user operation at the time of displaying the UI screen, widgets such as a "label", "tooltip", "balloon help", "progress bar", and "information bar" are used for a configuration of the UI screen. In addition, the IT device screen content 112 can use, as data in HTML or XML format, widgets such as a "modal window" and "palette window" to generate a screen.

(17) The WF client application 111 may use a program library, such as Microsoft Sync Framework, as an application synchronization library. Further, the workflow registration server 2001 may be used as a synchronization provider to be a partner of the synchronization session.

One or more embodiments of the present invention enable automation of a series of operations including collection, processing, and distribution of document images according to operations made on the touch panel display 1003, whereby it can be widely used in industrial fields requiring storage of a large amount of documents, such as, in addition to an industry of OA devices, real estate industry, distribution industry, and finance industry.

According to one or more embodiments of the present invention, in executing a workflow, a switching control means switches display performed by a display operation panel to either a first screen or a second screen in accordance with a determination criterion related to functions exhibited by the image processing apparatus. In such a configuration, an IT processing apparatus does not need to support all the functions exhibited by the image processing apparatus as long as it supports basic functions. Workflows can be advanced with the support of the basic functions. It becomes possible to divert screens created by the image processing apparatus for functions not considered to be basic and functions with less cost effectiveness, whereby an increase in man-hours required for development can be suppressed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An integrated apparatus comprising:
an image processing apparatus;
an Information Technology (IT) processing apparatus; and
a common display operation panel, wherein
the integrated apparatus causes the common display operation panel to selectively display a first screen generated by the image processing apparatus and a second screen generated by the IT processing apparatus,
the integrated apparatus:
obtains a workflow that combines a job executed by the image processing apparatus and a job executed by the IT processing apparatus;
launches an application and causes each of the image processing apparatus and the IT processing apparatus to execute the job indicated in the workflow; and
switches, based on a determination criterion related to a function exhibited by the image processing apparatus, display by the display operation panel at a time when the job indicated in the workflow is executed by the image processing apparatus, to the first screen or the second screen, and
the determination criterion indicates at least one of:
whether a notification content to be notified to a user is not presented on the second screen and is presented on the first screen; and
whether an operational item for accepting a user instruction is not presented on the second screen and is presented on the first screen.

2. The integrated apparatus according to claim 1, wherein the determination criterion is a table that indicates a plurality of processes of the job executed by the image processing apparatus,
each of the processes relates to a function attribute,
the function attribute indicates whether a function performed in a corresponding process among the processes is supported by the IT processing apparatus, and
the integrated apparatus determines whether the common display operation panel displays the first screen or the second screen based on presence and absence of function support indicated in a plurality of function attributes corresponding to the processes of the job executed by the image processing apparatus.

3. The integrated apparatus according to claim 2, wherein the image processing apparatus starts each of a plurality of tasks corresponding to the processes of the job,
a process corresponding to the function attribute is expressed by progress information that indicates a task status of each of the processes, and
the integrated apparatus obtains, at a time when a status of the started task transitions, the progress information after the transition from the image processing apparatus via a network, and determines whether the common display operation panel displays the first screen or the second screen based on the function attribute associated with the progress information.

4. The integrated apparatus according to claim 2, wherein the first screen comprises an operational item that accepts an instruction to switch to the first screen, and if a process with a function attribute indicating that there is no function support is reached, the operational item does not appear in the first screen, or the operational item is invalidated.

5. The integrated apparatus according to claim 2, wherein the first screen comprises an operational item for accepting an instruction to switch to the first screen based on intention of a use, and
if a process with a function attribute indicating that there is no function support is reached, the integrated apparatus temporarily switches the display of the common display operation panel and then returns to display of the first screen.

6. The integrated apparatus according to claim 2, wherein the IT processing apparatus further comprises a storage that stores a database including the function attributes, the database enables search by a type of the workflow, the integrated apparatus searches the database using a job type that is indicated in the workflow and to be used as a keyword, and reads out the table that matches the job type from the storage, and
each time the job progresses, determination is made on whether a current job has reached a process with the function attribute indicating that there is no function support with reference to function attributes indicated in the read table.

7. The integrated apparatus according to claim 2, wherein the IT processing apparatus further obtains the function attributes from a registration server together with the workflow, and
each time a process of the workflow progresses, the integrated apparatus refers to the function attributes and determines whether a current job has reached a process with the function attribute indicating that there is no function support.

8. The integrated apparatus according to claim 1, wherein the determination criterion is a table that indicates a plurality of the screens displayed during processing of the workflow,
each of the screens relates to a function attribute,
the function attribute indicates whether a function performed in the image processing apparatus is supported by the IT processing apparatus,
the function is performed in displaying a corresponding screen among the screens, and
the integrated apparatus determines whether the common display operation panel displays the first screen or the second screen based on presence and absence of function support indicated in the function attribute corresponding to each of the screens.

9. The integrated apparatus according to claim 1, wherein the determination criterion is a table that indicates a plurality of the screens displayed during processing of the workflow,
any one of display states of the screens relates to a function attribute,
the function attribute indicates whether a function is supported by the IT processing apparatus,
the function is performed at the time when the first screen has become a corresponding display state among the display states, and
the integrated apparatus determines whether the common display operation panel displays the first screen or the second screen based on presence and absence of function support that indicates whether the corresponding display state is supported.

10. The integrated apparatus according to claim 1, wherein
the common display operation panel is connected to an interface of the image processing apparatus and an interface of the IT processing apparatus via a cable, switches an input source of image signals between the first screen and the second screen, and switches an output destination of operation signals indicating operations made on the first and second screens to at least one of input and output of the interface of the image processing apparatus or the IT processing apparatus, and
the first screen and the second screen is switched by setting the input source of the image signals and the output destination of the operation signals to at least one of input and output of the interface of the IT processing apparatus via the cable or at least one of input and output of the interface of the image processing apparatus via the cable.

11. A workflow execution control system for causing an integrated apparatus to execute a workflow, the integrated apparatus causes a common display operation panel to selectively display a first screen generated by an image processing apparatus and a second screen generated by an Information Technology (IT) processing apparatus, the workflow execution control system:
obtains the workflow that combines a job executed by the image processing apparatus and a job executed by the IT processing apparatus;
launches an application and causes each of the image processing apparatus and the IT processing apparatus to execute the job indicated in the workflow; and
switches based on a determination criterion related to a function exhibited by the image processing apparatus, display by the display operation panel at a time when the job indicated in the workflow is executed by the image processing apparatus, to the first screen or the second screen, wherein
the determination criterion indicates at least one of:
whether a notification content to be notified to a user is not presented on the second screen and is presented on the first screen; and
whether an operational item for accepting a user instruction is not presented on the second screen and is presented on the first screen.

12. An Information Technology (IT) processing apparatus that is integrated with an image processing apparatus and uses a common display operation panel to selectively display a first screen generated by the image processing apparatus and a second screen generated by the IT processing apparatus, the IT processing apparatus:
obtains a workflow that combines a job executed by the image processing apparatus and a job executed by the IT processing apparatus;
launches an application and causes each of the image processing apparatus and the IT processing apparatus to execute the job in the workflow; and
switches, based on a determination criterion related to a function exhibited by the image processing apparatus, display by the display operation panel at a time when the job indicated in the workflow is executed by the image processing apparatus, to the first screen or the second screen, wherein
the determination criterion indicates at least one of:
whether a notification content to be notified to a user is not presented on the second screen and is presented on the first screen; and whether an operational item for accepting a user instruction is not presented on the second screen and is presented on the first screen.

13. A non-transitory recording medium storing a computer readable program causing a computer of an Information Technology (IT) processing apparatus that is integrated with an image processing apparatus and uses a common display operation panel to selectively display a first screen generated by the image processing apparatus and a second screen generated by the computer, the program causing the computer to perform:

obtaining the workflow that combines a job executed by the image processing apparatus and a job executed by the IT processing apparatus;

launching an application and causing each of the image processing apparatus and the IT processing apparatus to execute the job indicated in the workflow; and switching, based on a determination criterion related to a function exhibited by the image processing apparatus, display by the display operation panel at a time when the job indicated in the workflow is executed by the image processing apparatus, to the first screen or the second screen, wherein the determination criterion indicates at least one of:

whether a notification content to be notified to a user is not presented on the second screen and is presented on the first screen; and whether an operational item for accepting a user instruction is not presented on the second screen and is presented on the first screen.

* * * * *